United States Patent
Ji et al.

(10) Patent No.: US 10,792,609 B2
(45) Date of Patent: Oct. 6, 2020

(54) NITROGEN CONSERVATION IN POLYMERIZATION PROCESSES

(71) Applicant: Chevron Phillips Chemical Company LP, The Woodlands, TX (US)

(72) Inventors: Lei Ji, Kingwood, TX (US); Gregory G. Hendrickson, Kingwood, TX (US); Robert R. McElvain, Kingwood, TX (US); Steven D. Bridges, Porter, TX (US); Jennifer F. Drew, Humble, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 234 days.

(21) Appl. No.: 15/972,613

(22) Filed: May 7, 2018

(65) Prior Publication Data
US 2019/0336906 A1 Nov. 7, 2019

(51) Int. Cl.
*B01D 53/047* (2006.01)
*C01B 21/04* (2006.01)
*C08F 10/02* (2006.01)
*B01J 20/10* (2006.01)
*B01J 20/34* (2006.01)

(52) U.S. Cl.
CPC ......... *B01D 53/047* (2013.01); *B01J 20/103* (2013.01); *B01J 20/3433* (2013.01); *B01J 20/3458* (2013.01); *C01B 21/045* (2013.01); *C08F 10/02* (2013.01); *B01D 2253/106* (2013.01); *B01D 2256/10* (2013.01); *B01D 2259/401* (2013.01); *C01B 2210/0014* (2013.01)

(58) Field of Classification Search
CPC ............ B01D 53/047; B01D 2253/104; B01D 2253/106; B01D 2253/108; B01D 2257/30; B01D 2257/406; B01D 2257/502; B01D 2257/504; B01D 2257/702; B01D 2257/80; B01D 2259/401; B01J 20/103; B01J 20/3433; B01J 20/3458; C01B 21/045; C01B 2210/0014; C08F 10/02
USPC .......... 95/90, 96, 98, 148; 96/108, 121, 131, 96/132
See application file for complete search history.

(56) References Cited

U.S. PATENT DOCUMENTS

| | | | |
|---|---|---|---|
| 2,625,915 | A | 1/1953 | Glasgow et al. |
| 2,941,018 | A | 6/1960 | Foreman |
| 3,005,826 | A | 10/1961 | Fleck et al. |
| 3,061,601 | A | 10/1962 | Watt |

(Continued)

OTHER PUBLICATIONS

Delta Adsorbents, "Silica Gel Desiccant, Bulk Silica Gel," Apr. 26, 2017, https://www.deltaadsorbents.com/silica-gel-desiccant, 5 pages.

(Continued)

*Primary Examiner* — Frank M Lawrence Jr.
(74) *Attorney, Agent, or Firm* — Conley Rose, P.C.

(57) ABSTRACT

A system for recovering nitrogen during regeneration of a treater, the system including an adsorbent bed downstream of the treater, wherein the adsorbent bed comprises an adsorbent operable to adsorb at least one impurity from a treater bed regeneration effluent stream comprising nitrogen to provide a nitrogen product having a higher nitrogen purity than a nitrogen purity of the treater bed regeneration effluent stream. A method for recovering nitrogen during regeneration of a treater is also provided.

20 Claims, 5 Drawing Sheets

(56) References Cited

U.S. PATENT DOCUMENTS

| | | | |
|---|---|---|---|
| 3,248,179 A | 4/1966 | Norwood | |
| 3,283,025 A | 11/1966 | Lenz et al. | |
| 3,585,971 A | 6/1971 | Mockelrath et al. | |
| 4,212,847 A | 7/1980 | Volmer et al. | |
| 4,501,885 A | 2/1985 | Sheik et al. | |
| 5,028,670 A | 7/1991 | Chinh et al. | |
| 5,346,536 A | 9/1994 | Kaneshige et al. | |
| 5,441,558 A | 8/1995 | Lee et al. | |
| 5,534,607 A | 7/1996 | Martens et al. | |
| 5,543,129 A * | 8/1996 | Brahmbhatt | B01D 53/047 422/211 |
| 5,565,175 A | 10/1996 | Hottovy et al. | |
| 5,575,979 A | 11/1996 | Hanson | |
| 6,096,840 A | 8/2000 | Bernier et al. | |
| 6,239,235 B1 | 5/2001 | Hottovy et al. | |
| 6,355,594 B1 | 3/2002 | McDaniel et al. | |
| 6,376,415 B1 | 4/2002 | McDaniel et al. | |
| 6,395,666 B1 | 5/2002 | McDaniel et al. | |
| 6,511,936 B1 | 1/2003 | Theopold et al. | |
| 6,524,987 B1 | 2/2003 | Collins et al. | |
| 6,528,448 B1 | 3/2003 | Jensen et al. | |
| 6,531,565 B2 | 3/2003 | Kellum et al. | |
| 6,534,609 B2 | 3/2003 | Mitchell et al. | |
| 6,559,247 B2 | 5/2003 | Kufeld et al. | |
| 6,610,124 B1 | 8/2003 | Dolan et al. | |
| 6,767,386 B2 | 7/2004 | Kawai et al. | |
| 6,828,268 B1 | 12/2004 | McDaniel et al. | |
| 6,833,415 B2 | 12/2004 | Kendrick et al. | |
| 6,852,660 B2 | 2/2005 | Mitchell et al. | |
| 6,911,505 B2 | 6/2005 | Small | |
| 6,911,506 B2 | 6/2005 | Small et al. | |
| 6,936,667 B2 | 8/2005 | Jensen et al. | |
| 6,977,235 B2 | 12/2005 | McDaniel et al. | |
| 7,056,977 B2 | 6/2006 | Kusudou et al. | |
| 7,087,685 B2 | 8/2006 | Burns et al. | |
| 7,109,277 B2 | 9/2006 | Hawley et al. | |
| 7,119,153 B2 | 10/2006 | Jensen et al. | |
| 7,148,298 B2 | 12/2006 | Jensen et al. | |
| 7,163,906 B2 | 1/2007 | McDaniel et al. | |
| 7,226,886 B2 | 6/2007 | Jayaratne et al. | |
| 7,247,594 B2 | 7/2007 | Jayaratne et al. | |
| 7,378,537 B2 | 5/2008 | Small et al. | |
| 7,501,372 B2 | 3/2009 | Thorn et al. | |
| 7,517,939 B2 | 4/2009 | Yang et al. | |
| 7,531,606 B2 | 5/2009 | Hendrickson | |
| 7,598,327 B2 | 10/2009 | Shaw | |
| 7,652,108 B2 | 1/2010 | Mei et al. | |
| 8,012,900 B2 | 9/2011 | Murray et al. | |
| 8,119,553 B2 | 2/2012 | Yang et al. | |
| 8,138,113 B2 | 3/2012 | Yang et al. | |
| 8,207,280 B2 | 6/2012 | Murray et al. | |
| 8,288,487 B2 | 10/2012 | Yang et al. | |
| 8,383,754 B2 | 2/2013 | Yang et al. | |
| 8,431,729 B2 | 4/2013 | Martin et al. | |
| 8,501,651 B2 | 8/2013 | Ding et al. | |
| 8,703,886 B1 | 4/2014 | Yang et al. | |
| 8,846,841 B2 | 9/2014 | Yang et al. | |
| 8,912,285 B2 | 12/2014 | Yang et al. | |
| 8,932,975 B2 | 1/2015 | Yang et al. | |
| 8,987,394 B2 | 3/2015 | Hlavinka et al. | |
| 2003/0070546 A1 * | 4/2003 | Zwilling | B01D 53/047 95/96 |
| 2003/0073788 A1 * | 4/2003 | Golden | B01D 53/047 526/72 |
| 2006/0063896 A1 * | 3/2006 | McElvain | B01J 19/0013 526/70 |
| 2007/0117939 A1 * | 5/2007 | Iaccino | C08F 2/06 526/90 |
| 2017/0232422 A1 | 8/2017 | Romig et al. | |

OTHER PUBLICATIONS

Gabelman, Alan, "Back to Basics—Adsorption Basics: Part 2," Aug. 2017, CEP, pp. 38-45.
Sorbentsystems, "Desiccant Types," Apr. 26, 2017, https://www.sorbentsystems.com/desiccants_types.html, 4 pages.

* cited by examiner

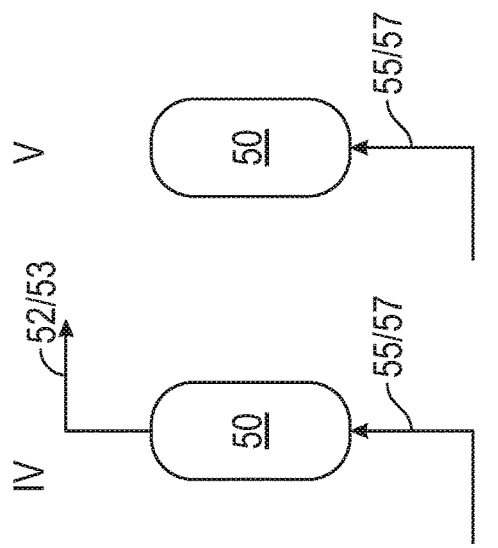
FIG. 2E
FIG. 2D
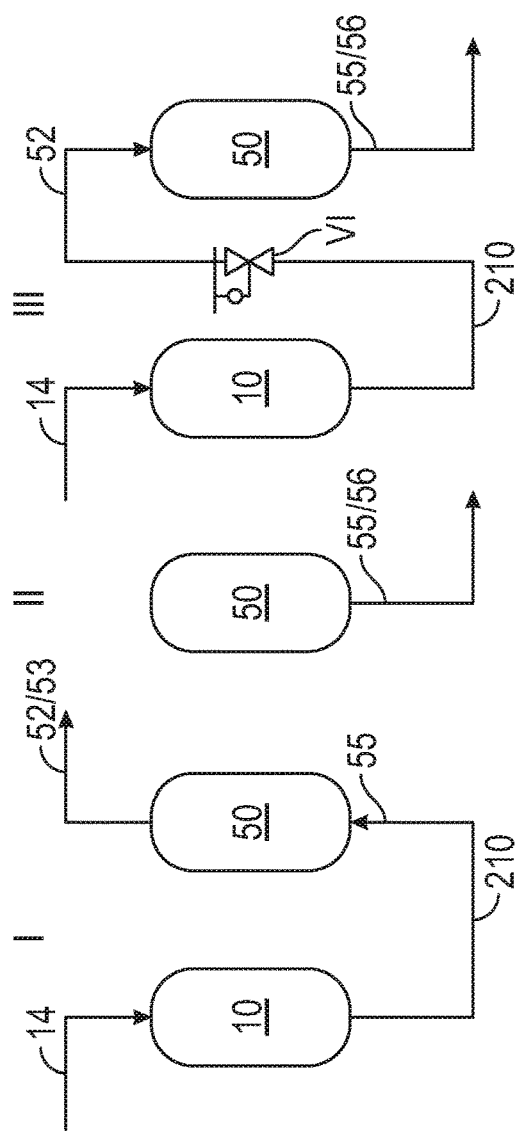
FIG. 2C
FIG. 2B
FIG. 2A

1

NITROGEN CONSERVATION IN POLYMERIZATION PROCESSES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to conservation of nitrogen in polymerization processes; more particularly, this disclosure relates to conservation of nitrogen during regeneration of feed stream treaters (e.g., fresh or recycle feed stream treaters) in olefin polymerization processes and systems, and during nitrogen transport of polymer fluff.

BACKGROUND

Polyolefins can be prepared by polymerization of olefins in one or more reactors where feed materials such as diluent, monomer, comonomer and catalyst are introduced. The catalyst used can be sensitive to process impurities, or "poisons." Thus, polyolefin production processes generally include treating reactor feeds to remove impurities prior to introduction of the feeds into the polymerization reactor(s). Techniques for treating reactor feeds include using a desiccant, which traps the impurities. Over time, the desiccant can become saturated with impurities, creating a need for regeneration of the desiccant in order to maintain effective removal of the impurities. However, current regeneration processes can be costly, both in terms of nitrogen utilized for treater regeneration and fuel gas consumption for flaring, and in terms of the costs associated with regeneration times being several days in some cases.

Nitrogen is also often used to convey reactor fluff (e.g., polyethylene fluff), for example from a purge column to an extruder feed vessel. The nitrogen is recirculated for closed-loop conveying. Without a purge, volatile hydrocarbons can accumulate in the nitrogen and may become problematic. Purging of nitrogen is typically utilized to limit the build-up of volatile hydrocarbons.

During polymer production it is also necessary to purge unreacted monomers and diluent hydrocarbons from the reactor fluff. Nitrogen is used to effect this purge in a purge column and the nitrogen is typically recovered and purified in an Isobutane Nitrogen Recovery Unit (INRU), wherein the nitrogen is recovered and recycled to the purge column. A significant purge is removed from this INRU recycle nitrogen, in order to limit hydrocarbons from building in the recovered nitrogen.

The purge nitrogen from the closed-loop conveyance and INRU recycle is typically sent to flare, where fuel gas (e.g., natural gas) is added to the nitrogen in order to achieve 350-700 BTU/ft$^3$, thereby allowing oxidized destruction of the trace hydrocarbons therein. High purity nitrogen is fairly expensive, with a price about equal to that of natural gas. Continuous flare of significant amounts of nitrogen can result in NOx emissions and complications in obtaining air permits. Accordingly, there is a need for methods and systems that provide for nitrogen conservation in polymer production plants.

SUMMARY

Herein disclosed is a system for recovering nitrogen during regeneration of a treater, the system comprising: an adsorbent bed downstream of the treater, wherein the adsorbent bed comprises an adsorbent operable to adsorb at least one impurity from a treater bed regeneration effluent stream comprising nitrogen to provide a nitrogen product having a higher nitrogen purity than a nitrogen purity of the treater bed regeneration effluent stream.

Also disclosed herein is a method for recovering nitrogen during regeneration of a treater bed, the method comprising: introducing a treater bed regeneration effluent stream comprising nitrogen and at least one impurity into an adsorbent bed, wherein the adsorbent bed comprises an adsorbent operable to adsorb the at least one impurity from the treater bed regeneration effluent stream to provide a nitrogen product having a higher nitrogen purity than a nitrogen purity of the treater bed regeneration effluent stream.

Further disclosed herein is a closed-loop nitrogen transport system comprising: a first transfer line configured for nitrogen pressure conveyance of a polymer fluff from at least one upstream vessel to at least one downstream vessel; a second transfer line configured to return a nitrogen gas stream comprising primarily nitrogen from the at least one downstream vessel to the at least one upstream vessel; a conveyor blower operable to provide flow throughout the closed loop; and a treatment unit operable to remove hydrocarbons from at least a portion of the nitrogen gas stream comprising primarily nitrogen, to provide a purified nitrogen stream.

Also disclosed herein is a closed-loop nitrogen transport process comprising: conveying, with nitrogen gas, a polymer fluff from at least one upstream vessel to at least one downstream vessel via a first transfer line; utilizing a conveyor blower to return a nitrogen gas stream comprising primarily nitrogen from the at least one downstream vessel to the at least one upstream vessel via a second transfer line; introducing at least a portion of the nitrogen gas stream comprising primarily nitrogen into a treatment unit operable to remove hydrocarbons therefrom and provide a purified nitrogen stream; and introducing at least a portion of the purified nitrogen stream into the at least upstream vessel, the first transfer line, the second transfer line, or a combination thereof, whereby a concentration of hydrocarbons in the nitrogen gas stream comprising primarily nitrogen is maintained at a desired level.

BRIEF DESCRIPTION OF THE DRAWINGS

The following figures illustrate aspects of the subject matter disclosed herein. The claimed subject matter may be understood by reference to the following description taken in conjunction with the accompanying figures, in which:

FIG. 2A illustrates a process flow diagram of a silica bed adsorption stage I;

FIG. 2B is a schematic of a silica bed depressurization stage II;

FIG. 2C is a schematic of a first silica bed regeneration (e.g., regeneration/remove hydrocarbons) stage III;

FIG. 2D is a schematic of an optional second silica bed regeneration (e.g., regeneration/remove poisons) stage IV;

FIG. 2E is a schematic of an optional silica bed repressurization stage V;

DETAILED DESCRIPTION

Figure 1:
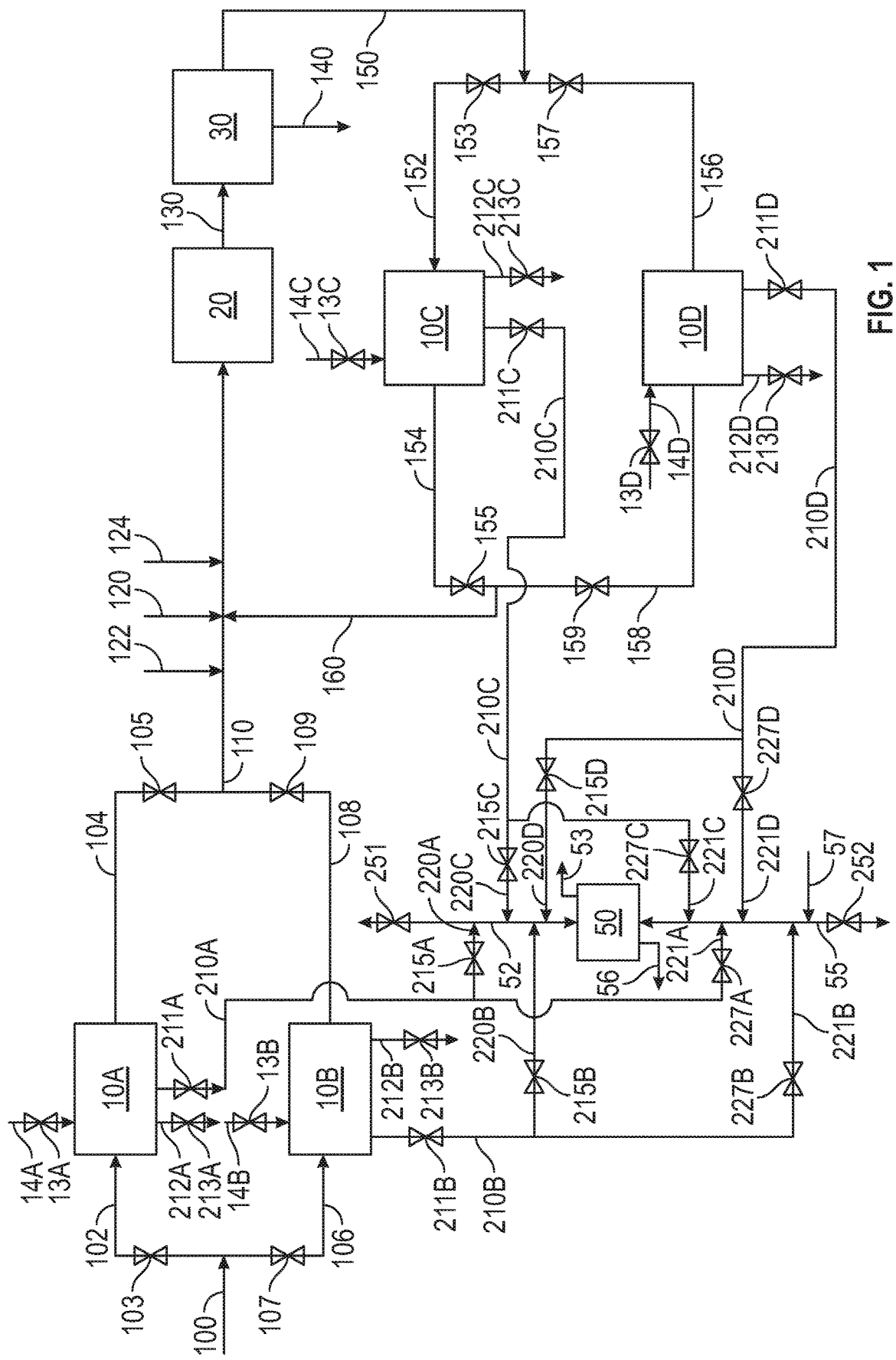
FIG. 1 illustrates a process flow diagram of an embodiment of a polyolefin production system comprising treaters for feed and recycle streams and a silica bed which may be utilized to conserve nitrogen during regeneration of the treater(s)

Disclosed herein are equipment, systems, and processes which provide for nitrogen conservation during regeneration of treaters for feed and recycle streams and during nitrogen transport of polymer fluff in a polymer (e.g., a polyolefin) production process.

One or more adsorbent beds can be utilized to recover nitrogen during regeneration of hydrocarbon treater(s). In an aspect, a silica bed is utilized to recover nitrogen from polyethylene (PE) plant treaters regeneration vent stream(s). In PE plants, there are treaters dedicated to removing impurities from ethylene feed, comonomer such as 1-hexene, and diluent such as isobutane. These treaters are generally packed beds comprising different desiccant adsorbents, with zeolite 3A as one typical adsorbent. Although described hereinbelow with reference to treaters containing desiccant beds, in embodiments, the treaters are catalytic treaters comprising catalyst beds therein. For example, catalytic treaters may contain catalyst beds of a catalyst, such as copper or palladium catalyst, to remove carbon monoxide, oxygen, acetylene, and methylacetylene-propadiene (MAPD). Such catalytic treaters may employ nitrogen sweep to remove hydrocarbons therefrom. The treater of this disclosure may thus comprise one or more adsorbent bed or a catalyst bed.

While impurities such as moisture, carbon dioxide, methanol, and ammonia can be main targets to be adsorbed in the treater, small amounts of hydrocarbons are also adsorbed. During a treater regeneration process (a typical regeneration schedule is about once every 30 days or 12 times per year), these adsorbed hydrocarbons are removed from the bed in depressurization and nitrogen purge steps. Hydrocarbon present in the nitrogen purge stream is usually present in trace amounts (up to several thousand ppm), and this purge stream is generally sent to flare. After this nitrogen purge step, the treater bed is heated to a desired regeneration temperature with hot nitrogen flow. Once the treater bed is regenerated, it is cooled down close to ambient temperature with nitrogen flow. Nitrogen flow during the treater purge and cool down steps of treater regeneration can be in the thousands of pounds per hour range for extended periods of time. When these treater effluent vent streams are sent to flare, in addition to the formation of a significant amount of NOx emissions, hydrocarbons in the flared streams have been diluted, which results in additional fuel requirements to maintain the mandated minimum flare heating value. Additionally, for plants that are bottlenecked by an environmental permit, any reduction in emissions can help increase production to boost the profit. According to aspects of this disclosure, adsorption of hydrocarbon with a downstream adsorbent bed comprising silica gel is utilized to recover treater regeneration purge step and cool down step nitrogen, and enriched hydrocarbons can be sent to flare.

The treaters can include a pair of feed treaters having desiccant (e.g., in one or more desiccant beds) or, as noted above, catalyst (e.g., in one or more catalyst beds) therein for removing water or other impurities from a feed stream of a polymer (e.g., polyolefin) production process. In operation, at least one of the pair of feed treaters can be on-line (e.g., operating in a continuous mode so as to accept a feed stream and treat the same to yield a treated feed stream) to treat the feed stream of the polymer production process which is passed through the feed treater(s) so as to remove one or more impurities. The treated feed stream which flows from the feed treatment system (optionally combined with a treated recycle stream comprising a diluent, with fresh comonomer, or both) passes to a polymerization reactor where polyolefins (also referred to herein interchangeably with the term polymer composition) are formed by contacting the olefin monomer from the treated feed stream with a catalyst system under conditions suitable for the formation of a polymer composition. An effluent is recovered from the polymerization reactor and separated to recover the polymer composition in a product stream and the diluent and any unreacted monomer, unreacted comonomer, or combination thereof in a recycle stream. The recycle stream can be treated in other treaters, which can include one or a pair of recycle treaters having desiccant (e.g., one or more desiccant beds) or, as noted above, catalyst (e.g., in one or more catalyst beds) therein for removing water or other impurities from the recycle stream. In operation, at least one of the pair of recycle treaters is on-line (e.g., operates in a continuous mode so as to accept the recycle stream and treat same to yield a treated recycle stream) to treat the recycle stream of the polyolefin production process which is passed through the recycle treater(s) so as to remove one or more impurities. The treated recycle stream can be recycled to the polymerization reactor.

During the course of operation, the treaters of the polyolefin production process may become saturated with impurities, causing impurities to flow through the treaters and into the polymerization reactor. An increase in the melt index of the polymer composition, a decrease in polymerization efficiency, or both may indicate saturation of the desiccant in a treater. The feed treaters or recycle treaters can be operated in parallel pairs such that one of the pair of feed (e.g., monomer or comonomer feed) treaters or one of the pair of recycle (e.g., recycle diluent) treaters may be taken off-line line (e.g., isolated from flow of the feed stream or recycle stream by actuating valves as described hereinbelow) so that the desiccant therein may be regenerated while the other of the pair of feed treaters or the other of the pair of the recycle treaters is on-line.

The present disclosure includes the use of a downstream silica bed to adsorb contaminants from treater effluent stream(s) comprising nitrogen produced during regeneration of an off-line treater (e.g., one of a pair of feed treaters which is taken off-line for regeneration, one of a pair of recycle treaters which is taken off-line for regeneration, or both). Using a silica bed to adsorb contaminants from treater bed effluent streams as described herein provides for nitrogen recovery (e.g., substantially pure nitrogen product stream(s) can be recycled and reused), allowing for reduced amounts of nitrogen being sent to flare or other destruction or discharge, thus providing for reduced NOx emissions and reduced net nitrogen usage, and an enriched hydrocarbon content in a discharge tail gas, which can provide for reduced fuel gas usage, steam usage, or both in the destruction (e.g., flare) process, along with concomitant financial savings.

Referring to FIG. 1, there is shown a process flow diagram of a polyolefin production system which comprises a pair of feed treaters 10A and 10B for a feed stream 100, a polymerization zone 20, a product recovery system 30, a pair of recycle treaters 10C and 10D for a recycle stream 150, and a silica bed 50. In embodiments, the feed treaters comprise monomer treaters, such as, without limitation, ethylene treaters or propylene treaters. Although the feed treaters are discussed further below with reference to the embodiment of FIG. 1 as monomer feed treaters, the feed treaters may be treaters for another feed component. For example, the feed treaters can comprise comonomer treaters, such as 1-hexene treaters, butene treaters, octene treaters (and degassing may be utilized downstream of the treater(s), as known in the art). The treaters may comprise fresh, recycle, or olefin-free diluent treaters (e.g., treaters for fresh, recycle, or olefin-free propane, isobutane, pentanes, hexanes), in embodiments. In aspects, the recycle treaters comprise recycle diluent treaters, such as recycle isobutane treaters, olefin-free diluent treaters, such as olefin-free isobutane treaters, or a combination thereof. Nonlimiting examples of treaters in polyolefin production systems as disclosed herein include ethylene treaters, deethanizer overhead treaters, recycle isobutane treaters, olefin-free isobutane treaters, hexene treaters, and the like, or combinations thereof.

The treaters may be employed in full fractionation design facilities, or minimum fractionation design facilities. For example, in embodiments, the product recovery system 30 can comprise a diluent regeneration system, wherein the diluent regeneration system can further comprise a dehexanizer, a deethanizer, or both. Depending on the configuration of the product recovery system 30, recycle stream 150 can comprise recycle diluent (e.g., recycle isobutane), olefin-free diluent (e.g., olefin-free isobutane), or both. For purposes of the disclosure herein an "olefin-free" diluent (e.g., olefin-free isobutane) refers to a diluent (e.g., isobutane) that can be free of olefins, alternatively, substantially free of olefins, alternatively, essentially free of olefins, or alternatively, consist or consist essentially of non-olefins. For example, olefins can be present in an olefin-free diluent (e.g., olefin-free isobutane) in an amount of less than about 1% by total weight of the olefin-free diluent, alternatively, less than about 0.5%, alternatively, less than about 0.4%, alternatively, less than about 0.3%, alternatively, less than about 0.2%, alternatively, less than about 0.1%, alternatively, less than about 0.05%, or alternatively, less than about 0.01%. In aspects, the off-line treater being regenerated can comprise one or more of an ethylene treater, a hexene treater, an isobutane treater, an isopentane treater, a pentane treater, and a deethanizer column overhead treater. In aspects, the off-line treater being regenerated can comprise one or more of an ethylene treater, a hexene (e.g., 1-hexene) treater, and an isobutane treater (e.g., a recycle isobutane treater, olefin-free isobutane treater). In aspects, some polyolefin production systems can be configured for processing hexene (e.g., polyolefin production systems can include one or more hexene treaters). In aspects, other polyolefin production systems may not be configured to process hexene (e.g., polyolefin production systems do not include a hexene treater).

Feed stream 100 may include one or more olefin monomers as well as one or more impurities. The one or more olefin monomers may include linear or branched olefins having from 2 to 30 carbon atoms. Examples of olefin monomers include ethylene, propylene, 1-butene, 1-hexene, 1-octene, 3-methyl-1-butene, 4-methyl-1-pentene, and combinations thereof. The one or more impurities removed via the feed treater (or recycle treater discussed below) may include water, carbon dioxide, carbon monoxide, alcohols, acetylene, carbonyls, sulfur compounds, peroxides, ammonia, amines, phosphines, oxygen, or combinations thereof.

Additionally, feed stream 100 may include one or more other components such as a catalyst, co-catalysts, fresh diluent, additives, or combinations thereof. As discussed herein, the one or more other components may alternatively be added to the polyolefin production process in other locations.

Feed treaters 10A and 10B are operated in parallel such that at least one of the feed treaters 10A and 10B is on-line to treat (e.g., remove one or more impurities from) the feed stream 100, while the other of the feed treaters 10A and 10B is off-line being regenerated, standing by to go on-line, or also on-line but not saturated with impurities. While FIG. 1 shows a single pair of feed treaters 10A and 10B, it is contemplated that polyolefin production processes may include multiple pairs of feed treaters, for example from 2 to 20 pairs of feed treaters, or from 2 to 10 pairs of feed treaters, or from 2 to 5 feed treaters.

Each of the feed treaters 10A and 10B may be a vessel having desiccant therein arranged in one or more desiccant beds. For example, and without limitation, each treater 10A and 10B may have from 1 to 30, from 1 to 20, or from 1 to 15 desiccant beds. The desiccant is discussed in more detail herein. The polyolefin production system can comprise from 2 to 40 treaters.

In an embodiment where feed treater 10A is on-line and feed treater 10B is off-line, valve 103 in stream 102 and valve 105 in stream 104 are in the open position, and valve 107 in stream 106 and valve 109 in stream 108 are in the closed position. Untreated olefin monomer of feed stream 100 flows through valve 103 and stream 102 such that the untreated olefin monomer is introduced into treater 10A. In an aspect, the untreated olefin monomer is introduced into the treater 10A at the bottom of said treater 10A. The olefin monomer flows through the desiccant beds in the treater 10A, for example, from the bottom to the top of the treater 10A, and one or more impurities are removed from the olefin monomer by the desiccant contained in the treater 10A. The treated monomer flows from the treater 10A via stream 104, valve 105, stream 110, and into polymerization zone 20. The flow of the olefin monomer in treater 10A may alternatively be from top to bottom.

In an aspect where feed treater 10B is on-line and feed treater 10A is off-line, valve 107 in stream 106 and valve 109 in stream 108 are in the open position, and valve 103 in stream 102 and valve 105 in stream 104 are in the closed position. Untreated olefin monomer of the feed stream 100 flows through valve 107 and stream 106 such that the untreated olefin monomer is introduced into treater 10B. In an aspect, the untreated olefin monomer is introduced into the treater 10B at the bottom of said treater 10B. The olefin monomer flows through the desiccant beds in the treater 10B, for example, from the bottom to the top of the treater 10B, and one or more impurities are removed from the olefin monomer by the desiccant contained in the treater 10B. The treated monomer flows from the treater 10B via stream 108, valve 109, stream 110, and into polymerization zone 20. The flow of the olefin monomer in treater 10B may alternatively be from top to bottom.

Treatment conditions include a residence time sufficient to remove at least a portion of the impurities from the feed stream 100. Treatment conditions may include a temperature in the range of from about 35° F. (about 1.6° C.) to about 80° F. (about 27° C.); alternatively, from about 40° F. (about 4.4° C.) to about 70° F. (about 21° C.); alternatively, from about 45° F. (about 7.2° C.) to about 60° F. (about 15° C.), alternatively ambient temperature. In embodiments wherein the treater is a catalytic treater (e.g., utilizing a copper catalyst), the treatment conditions may include a temperature in the range of from about 194° F. (about 90° C.) to about 248° F. (about 120° C.). Treatment conditions may include a pressure in the range of from about 600 psig (about 4.14 MPag) to about 850 psig (about 5.86 MPag); alternatively, from about 700 psig (about 4.83 MPag) to about 825 psig (about 5.69 MPag); alternatively, from about 750 psig (about 5.17 MPag) to about 800 psig (about 5.52 MPag).

The treated feed flowing in stream 104, 108, or both generally includes a level of impurities that is less than a level of impurities present in the feed stream 100. The amount of an impurity or multiple impurities may be measured and monitored in stream 104, stream 108, feed stream 100, or a combination thereof, using techniques known in the art with the aid of this disclosure, for example, high performance liquid chromatography (HPLC), gas chromatography (GC), or Raman spectroscopy. The impurities may be measured in an online apparatus in streams 100, 104, 108, or a combination thereof, or a sample may be taken from any of stream 104, stream 108, and feed stream 100 and subsequently analyzed for impurity concentration. In embodiments, the treated feed flowing in stream 104, 108, or both may include less than 200 ppm, 150 ppm, 100 ppm, 75 ppm, or 50 ppm, 40 ppm, 30 ppm, 20 ppm, 10 ppm, 5 ppm, 4 ppm, 3 ppm, 2 ppm, 1 ppm, or 0.5 ppm of one or more impurities.

With continued reference to FIG. 1, fresh comonomer (e.g., hexene, butene, or combinations thereof) is illustrated as flowing in stream 120, fresh diluent flowing in stream 122, catalyst flowing in stream 124, and treated recycle diluent flowing in stream 160 may be combined with the treated feed in stream 110 prior to introduction to the polymerization zone 20. It is contemplated that any combination of comonomer, catalyst, fresh diluent, and treated recycle diluent may be added to the treated feed for introduction into the polymerization zone 20 via stream 110; or, any of comonomer, catalyst, fresh diluent, and treated recycle diluent may be introduced to the polymerization zone 20 in other locations of the polyolefin production process, e.g., any of the above-cited components may be combined with the components in feed stream 100, or any of the above-cited components may be introduced into the polymerization zone 20 separately of the feed stream 100 or treated feed stream 110. Moreover, while FIG. 1 shows fresh diluent is combined with the treated feed in stream 110 before comonomer and treated recycle diluent, which are combined before the catalyst, the order of combining components which are introduced to the polymerization zone 20 via stream 110 may vary according to techniques known to those skilled in the art with the aid of this disclosure.

The catalyst that can be employed in accordance with the methods and systems of the present disclosure may comprise any catalyst system compatible with and able to produce polyolefins. For example, the catalyst may be a chromium based catalyst system, a single site transition metal catalyst system including both single and multiple (two or more) metallocene catalyst systems, a Ziegler-Natta catalyst system, or combinations thereof. In embodiments, the catalyst may be activated for subsequent polymerization and may or may not be associated with a support material.

Examples of catalyst systems which can be used are described in U.S. Pat. Nos. 6,355,594; 6,376,415; 6,395, 666; 6,511,936; 6,524,987; 6,528,448; 6,531,565; 6,534, 609; 6,559,247; 6,828,268; 6,852,660; 6,911,505; 6,911, 506; 6,936,667; 6,977,235; 7,056,977; 7,109,277; 7,119, 153; 7,148,298; 7,163,906; 7,226,886; 7,247,594; 7,378, 537; 7,501,372; 7,517,939; 8,012,900; 8,119,553; 8,138, 113; 8,207,280; 8,288,487; 8,383,754; 8,431,729; 8,501, 651; 8,703,886; 8,846,841; 8,912,285; 8,932,975; and 8,987,394, each of which is incorporated by reference herein in its entirety.

The diluent may include hydrocarbons which are alkanes. Examples of suitable diluents for use in accordance with the present disclosure include but are not limited to propane, n-butane, isobutane, n-pentane, isopentane, neopentane, cyclohexane, n-hexane, heptane, or a combination thereof. In one or more specific embodiments, the diluent is selected from propane, isobutane, hexane, heptane, butane, or combinations thereof.

Hydrogen and other additives may also be introduced into the polymerization zone 20 (e.g. combined in stream 110, introduced separately, or combined with another component and introduced together with the other component). Hydrogen may be used to control the molecular weight of the polyolefin formed in the polymerization zone 20. Additives may include antistatic materials, chain transfer agents, or other additives known in the art of polyolefin production processes.

The polymerization zone 20 may include one or more polymerization reactors capable of polymerizing olefin monomers to produce polyolefins such as homopolymers or copolymers. In one or more embodiments, the polymerization of olefins may include the homopolymerization of ethylene or propylene; the copolymerization of ethylene and a higher 1-olefin (e.g., 1-butene, 1-pentene, 1-hexene, 1-octene or 1-decene); the copolymerization of propylene with ethylene or a higher 1-olefin (e.g., 1-butene, 1-pentene, 1-hexene, 1-octene or 1-decene), or combinations thereof (for polyolefin production processes having multiple reactors). Polymerization zone 20 can be a polyethylene production system, for example for the production of HDPE. Furthermore, the polyolefins produced may be unimodal, bimodal, or multimodal. A produced multimodal polyolefin may have a first component and a second component. The first component can be a linear low density polyethylene (LLDPE), and the second component can be a high density polyethylene (HDPE). The HDPE can be a high molecular weight (HMW) polyolefin or a low molecular weight (LMW) polyolefin. The LLDPE can be a high molecular weight (HMW) polyolefin or a low molecular weight (LMW) polyolefin. In an embodiment, the HDPE can be a HMW polyolefin, and the LLDPE can be a LMW polyolefin. The first component, the second component, or both the first component and the second component of the polyolefin can have short chain branching.

The various types of reactors suitable for use in the polymerization zone 20 include those known in the art which may be referred to as batch, slurry, gas-phase, solution, high pressure, tubular, or autoclave reactors. Continuous type reactors can include continuous flow stirred-tank (CSTR) reactors. Gas phase reactors may include fluidized bed reactors or staged horizontal reactors. Slurry reactors may include vertical or horizontal loop reactors. High pressure reactors may include autoclave reactors, tubular reactors, or a combination thereof, singly or in combination, and optionally in series. The reactor types can include batch or continuous processes. Continuous processes can utilize intermittent or continuous product discharge. Processes may also include partial or full direct recycle of un-reacted monomer, un-reacted co-monomer, diluent, or a combination thereof.

Where polymerization zone 20 has multiple reactors, the one or more reactors may include the same or different type of reactors. The operating conditions in one of the reactors may be different than the operating conditions in the other reactor(s). Multiple reactor systems may include any combination of reactors including, but not limited to, multiple loop reactors, multiple gas reactors, a combination of loop and gas reactors, multiple high pressure reactors, or a combination of high pressure with loop reactors, gas reactors, or both. The multiple reactors may be operated in series or in parallel.

Polyolefin production in multiple reactors may include two separate polymerization reactors interconnected by a transfer system thereby making it possible to transfer the polyolefin resulting from the first polymerization reactor into the second polymerization reactor. Alternatively, polymerization in multiple reactors may include the manual transfer of polyolefin from one reactor to subsequent reactors for continued polymerization.

Where polymerization zone 20 has at least two reactors, the first reactor can produce a first component of a polyolefin product, and the second reactor can produce a second component of a polyolefin product. The first component and the second component can have the characteristics described above. That is, the first component produced in the first reactor can be a linear low density polyethylene (LLDPE), and the second component produced in the second reactor can be a high density polyethylene (HDPE). The LLDPE can be a high molecular weight (HMW) polyolefin or a low molecular weight (LMW) polyolefin. The HDPE can be a high molecular weight (HMW) polyolefin or a low molecular weight (LMW) polyolefin. In an embodiment, the LLDPE produced in the first reactor can be a LMW polyolefin, and the HDPE produced in the second reactor can be a HMW polyolefin, and in some embodiments, the first component, the second component, or both the first component and the second component can have short chain branching.

The polymerization conditions within the polymerization zone 20 include temperature, pressure, flow rate, mechanical agitation, product takeoff, residence time, and concentrations. Any combination of these conditions may be selected to achieve the desired polyolefin properties. Conditions that are controlled for polymerization efficiency and to provide desired product properties may include temperature, pressure, and the concentrations of various reactants. Polymerization temperature can affect catalyst activity, molecular weight of the polyolefin, and molecular weight distribution of the polyolefin.

Polymerization temperatures may include any temperature below the de-polymerization temperature according to the Gibbs free energy equation. For example, the polymerization temperature may be in the range of about 140° F. (about 60° C.) to about 536° F. (about 280° C.), or about 158° F. (about 70° C.) to about 230° F. (about 110° C.), depending upon the type of polymerization reactor.

Polymerization pressures also vary according to the reactor and polymerization type. The pressure for liquid phase polymerizations in a slurry loop reactor may be less than about 1000 psig (about 6.90 MPag) while the pressure for gas phase polymerization may vary from about 200 psig (about 1.38 MPag) to about 500 psig (about 3.45 MPag). High pressure polymerization in tubular or autoclave reactors may run at pressures of from about 20,000 psig (about 138 MPag) to about 75,000 psig (about 517 MPag). Polymerization reactors can also be operated in a supercritical region occurring at generally higher temperatures and pressures.

The concentration of the various components (e.g., treated feed, treated recycle diluent, catalyst components, comonomer, hydrogen, additives, or combinations thereof) in the polymerization zone 20 can be controlled to produce polyolefins having certain physical and mechanical properties. The proposed end-use product that will be formed by the polyolefin(s) and the method of forming that product can determine the desired properties. Mechanical properties of the formed end-use product may include tensile, flexural, impact, creep, stress relaxation, and hardness tests. Physical properties of the polyolefin polymer produced may include density, molecular weight, molecular weight distribution, melting temperature, glass transition temperature, temperature melt of crystallization, density, stereoregularity, crack growth, long chain branching and rheological measurements, for example.

Examples of polymerization processes suitable for use in the polymerization zone 20 are described in U.S. Pat. Nos. 3,061,601; 3,248,179; 4,212,847; 4,501,885; 5,028,670; 5,534,607; 5,565,175; 5,575,979; 6,096,840; 6,239,235; 6,833,415; 7,531,606; 7,598,327; and 7,652,108, each of which is incorporated by reference herein in its entirety.

With continued reference to FIG. 1, reaction effluent flows from the polymerization zone 20 in stream 130 and into a product recovery system 30. The product recovery system 30 may include a take-off valve (which may be continuous or discontinuous), a heater (e.g., a flashline heater) for vaporizing liquid components from the polyolefin (e.g., diluent, unreacted monomer, and unreacted comonomer), a flash vessel for separating the polyolefin product from unreacted monomer, unreacted comonomer, diluent, residual catalyst, or combinations thereof. The polyolefin product may flow from the product recovery system 30 via stream 140, for example, to an extrusion/load-out system. Typically, the polyolefin product is in the form of polymer fluff which is further processed into pellets using an extrusion/load-out system for shipment to customers. In embodiments, the polymer fluff is transported to an extrusion/load-out system via a closed-loop nitrogen conveyance that provides nitrogen conservation as disclosed hereinbelow. The unreacted monomer, unreacted comonomer, diluent, residual catalyst, or combinations thereof may flow from the product recovery system via stream 150. The diluent can be propane, butane, isobutane, pentane, isopentane, hexane, heptane, or combinations thereof. The unreacted monomer can be ethylene, propylene, octene (e.g., 1-octene), or combinations thereof. The unreacted comonomer can be hexene, butene, or combinations thereof. The product recovery system 30 may include (in addition to or in the alternative to the flash vessel) one or more fractionation vessels to recover the diluent for recycle to the polymerization zone. For example, the one or more fractionation vessels may remove undesirable heavy components (e.g., $C_6$ hydrocarbons and heavier) and light components (e.g., hydrogen, oxygen, nitrogen, byproducts resulting from the presence of hydrogen/oxygen/nitrogen) from the diluent and unreacted monomer/comonomer. The one or more fractionation vessels may also separate unreacted monomer, comonomer, or both from the diluent to yield an olefin-free diluent stream. Examples of product recovery systems 30 are described in U.S. Pat. Nos. 4,501, 885; 5,534,607; 5,575,979; 6,096,840; 6,239,235; 6,833,415; 7,531,606; and 7,652,108, each of which is incorporated by reference herein in its entirety. Diluent (e.g., diluent or olefin-free diluent), which is to be recycled to polymerization zone 20, may also flow in stream 150 from product recovery system 30 to recycle treater 10C or 10D.

This disclosure contemplates that other configurations may be utilized to ultimately recover polyolefin product and recycle diluent than the configuration shown in FIG. 1. Embodiments of this disclosure may be applicable for any polyolefin production process comprising one or more feed or recycle treaters which may be regenerated in conjunction with a silica bed as described herein.

Recycle treaters 10C and 10D can be operated in parallel such that at least one of the recycle treaters 10C and 10D is on-line to treat (e.g., remove one or more impurities from) the recycle diluent in recycle stream 150, while the other of the recycle treaters 10C and 10D is off-line being regenerated, standing by to go on-line, or also on-line but not saturated with impurities. While FIG. 1 shows a single pair of recycle treaters 10C and 10D, it is contemplated that polyolefin production processes may include multiple pairs of recycle treaters, for example from 2 to 20 pairs of recycle treaters, or from 2 to 10 pairs of recycle treaters, or from 2 to 5 recycle treaters.

Each of the recycle treaters 10C and 10D may be a vessel having desiccant therein arranged in one or more desiccant beds. For example, each treater 10C and 10D may have from 1 to 30, from 1 to 20, or from 1 to 15 desiccant beds. The desiccant is discussed in more detail herein.

In an embodiment where recycle treater 10C is on-line and recycle treater 10D is off-line, valve 153 in stream 152 and valve 155 in stream 154 are in the open position, and valve 157 in stream 156 and valve 159 in stream 158 are in the closed position. Untreated recycle components (e.g., untreated diluent, unreacted monomer, unreacted comonomer, or combinations thereof) of the recycle stream 150 flow through valve 153 and stream 152 such that the untreated recycle components are introduced into treater 10C. In an embodiment, the untreated recycle components are introduced into the treater 10C at the bottom of said treater 10C. The recycle components flow through the desiccant beds in the treater 10C, for example, from the bottom to the top of the treater 10C, and one or more impurities are removed from the recycle components by the desiccant contained in the treater 10C. Treated recycle components (e.g., treated diluent, unreacted monomer, unreacted comonomer, or combinations thereof) may flow from the treater 10C via stream 154, valve 155, stream 160, and stream 110 into polymerization zone 20. The flow of the recycle components in treater 10C may alternatively be from top to bottom.

In an embodiment where recycle treater 10D is on-line and recycle treater 10C is off-line, valve 157 in stream 156 and valve 159 in stream 158 are in the open position, and valve 153 in stream 152 and valve 155 in stream 154 are in the closed position. Untreated recycle components (e.g., untreated diluent, unreacted monomer, unreacted comonomer, or combinations thereof) of the recycle stream 150 flow through valve 157 and stream 156 such that the untreated recycle components are introduced into treater 10D. In an aspect, the untreated recycle components are introduced into the treater 10D at the bottom of said treater 10D. The recycle components flow through the desiccant beds in the treater 10D, for example, from the bottom to the top of the treater 10D, and one or more impurities are removed from the recycle components by the desiccant contained in the treater 10D. The treated recycle components (e.g., treated diluent, unreacted monomer, unreacted comonomer, or combinations thereof) may flow from the treater 10D via stream 158, valve 159, stream 160, and stream 110 into polymerization zone 20. The flow of the recycle components in the treater 10D may alternatively be from top to bottom.

Recycle treatment conditions include a residence time sufficient to remove at least a portion of the impurities from the recycle stream 150. Treatment conditions may include a temperature in the range of from about 35° F. (about 1.6° C.) to about 80° F. (about 27° C.); alternatively, from about 40° F. (about 4.4° C.) to about 70° F. (about 21° C.); alternatively, from about 45° F. (about 7.2° C.) to about 60° F. (about 15° C.), alternatively ambient temperature. In embodiments, the treater is a catalytic treater (e.g., copper), and the treatment conditions include a temperature in the range of from about 194° F. (about 90° C.) to about 248° F. (about 120° C.). Treatment conditions may include a pressure in the range of about 600 psig (about 4.14 MPag) to about 850 psig (about 5.86 MPag); alternatively, about 700 psig (about 4.83 MPag) to about 825 psig (about 5.69 MPag); alternatively, about 750 psig (about 5.17 MPag) to about 800 psig (about 5.52 MPag).

The treated recycle components flowing in stream 154 and 158 generally includes a level of impurities that is less than a level of impurities present in the recycle stream 150. The amount of an impurity or multiple impurities may be measured and monitored in stream 154, stream 158, and recycle stream 150 using techniques known in the art with the aid of this disclosure, for example, high performance liquid chromatography (HPLC), gas chromatography (GC), or Raman spectroscopy. The impurities may be measured in an online apparatus in streams 1150, 154, 158, or a combination thereof, or a sample may be taken from any of stream 154, stream 158, and recycle stream 150 and subsequently analyzed for impurity concentration. In aspects, the treated recycle components may include less than 200, 150, 100, 75, 50, 40, 30, 20, 10, 9, 8, 7, 6, 5, 4, 3, 2, 1, or 0.5 ppm of impurities.

The disclosure contemplates that the polyolefin production process shown in FIG. 1 may include equipment such as storage tanks (e.g., for storing monomer, comonomer, diluent, and catalyst), accumulators, valves, pipes, pumps, heat exchangers, agitators, injection apparatus, flow meters, measurement equipment, control system, or other components, or combinations thereof which are not illustrated in FIG. 1 for purposes of clarity.

The desiccant in the one or more desiccant beds in treaters 10A, 10B, 10C, and 10D may be molecular sieve, activated alumina, silica gel, montmorillonite clay, calcium oxide, calcium sulfate, calcium chloride, activated carbon, metal salts, phosphorus-containing desiccant compounds, or combinations thereof. The term "molecular sieve" refers to a material having a fixed, open-network structure, usually crystalline, that may be used to separate hydrocarbons from the impurities disclosed herein by selective occlusion of one or more of the impurities. An example of a molecular sieve is a zeolite, which has a silicate lattice, often in association with aluminum, boron, gallium, iron, titanium, or a combination thereof An example of a zeolite is a 13× molecular sieve. In accordance with one or more embodiments, the molecular sieves have a pore size of 10 angstroms (Å) or more. An example of activated alumina is sodium treated alumina.

In embodiments, treaters 10A, 10B, 10C, and 10D can comprise one or more desiccant beds comprising a desiccant selected from alumina, a zeolite, an alumina-zeolite composite, or any other suitable desiccant as known or disclosed herein. An example of a composite desiccant suitable for use in the present disclosure includes AZ-300 adsorbent, which is a spherical alumina-zeolite composite adsorbent with low reactivity that is commercially available from UOP LLC. In embodiments, the desiccant comprises zeolite 3A, zeolite 4A, zeolite 13X, or a combination thereof. In aspects, the desiccant comprises activated alumina, such as, for example, SELEXSORB® available from BASF. In embodiments, treaters 10A, 10B, 10C, and 10D can comprise a catalyst bed comprising a catalyst, such as, without limitation, copper or palladium catalyst.

The desiccant (or catalyst) beds adsorb (retain) one or more of the disclosed impurities such that such impurities do not pass out of the treaters 10A, 10B, 10C, and 10D and into subsequent polymerization reactors (except in cases where a treater is saturated and impurities pass through the treaters). Once the desiccant (or catalyst) in any of treaters 10A, 10B, 10C, and 10D becomes saturated with one or more impurities, regeneration is required.

Regeneration of the desiccant in treaters 10A, 10B, 10C, and 10D generally involves i) taking the treater 10A, 10B, 10C, or 10D off-line, and ii) regenerating the desiccant. Generally, only one of the pair of feed treaters 10A and 10B, one of the pair of recycle treaters 10C and 10D, or one of a pair of comonomer or other treaters not indicated in the embodiment of FIG. 1 is taken off-line at a time.

Taking a treater 10A, 10B, 10C, or 10D off-line generally involves closing valves so as to fluidly isolate the treater which is to be taken off-line. To take treater 10A off-line, valves 103 and 105 are actuated to the closed position. To take treater 10B off-line, valves 107 and 109 are actuated to the closed position. To take treater 10C off-line, valves 153 and 155 are actuated to the closed position. To take treater 10D off-line, valves 157 and 159 are actuated to the closed position. It is contemplated that polyolefin production processes may have valves or piping in different configurations than that shown in FIG. 1, and the particular procedure for rendering a treater off-line (or for introducing treater effluent produced during regeneration thereof into a downstream adsorbent bed, as described hereinbelow) may be different than those described herein while still involving fluidly isolating the treater from the rest of the polyolefin production process.

To fluidly connect the feed treater 10A which is off-line for regeneration, valves 13A and 211A are moved to the open position such that the off-line feed treater 10 is fluidly connected to nitrogen stream 14A and to a flow path for the treater regeneration effluent stream exiting the treater via the treater effluent outlet line 210A. To fluidly connect the feed treater 10B which is off-line for regeneration, valves 13B and 211B are moved to the open position such that the off-line feed treater 10B is fluidly connected to nitrogen stream 14B and to a flow path for the treater regeneration effluent stream exiting the treater via the treater effluent outlet line 210B. To fluidly connect the recycle treater 10C which is off-line for regeneration, valves 13C and 211C are moved to the open position such that the off-line recycle treater 10C is fluidly connected to nitrogen stream 14C and to a flow path for the treater regeneration effluent stream exiting the treater via the treater effluent outlet line 210C. To fluidly connect the recycle treater 10D which is off-line for regeneration, valves 13D and 211D are moved to the open position such that the off-line recycle treater 10D is fluidly connected to nitrogen stream 14D and to a flow path for the treater regeneration effluent stream exiting the treater via the treater effluent outlet line 210D.

The process of regenerating the desiccant within a treater may be divided into phases: a depressurization phase, a purge phase, a heating phase, a cooling (or cool down) phase, a holding phase, or a combination thereof. In embodiments employing a catalytic treater, the regeneration step may include a reduction or oxidation step using hydrogen or air, respectively.

In aspects, the heating phase can be followed by the cooling phase. As will be appreciated by one of skill in the art, and with the help of this disclosure, the process of regenerating the desiccant can be a cyclical process that repeats a depressurization phase, a purge phase, a heating phase, a cooling phase, a holding phase, or combinations thereof, as necessary to regenerate treaters. For purposes of the disclosure herein, the term "regeneration cycle" refers to a heating phase, an optional holding phase, and a cooling phase that are consecutive. Each regeneration cycle may only have one heating phase and one cooling phase, but may have more than one holding phase, as necessary to achieve a suitable regeneration of the treater.

The treater 10A, 10B, 10C, or 10D to be regenerated is taken off-line, depressurized, and subjected to a purge phase. Preparing the off-line treater for regeneration generally involves depressurizing the off-line treater. Depressurizing the off-line treater generally involves releasing contents of the off-line treater until the pressure of the treater reaches a suitable pressure, e.g., about 150 psig (1.03 MPag) or less. The contents of the off-line treater can be released through a vent stream or one or more of the streams shown in FIG. 1 for treaters 10A, 10B, 10C, and 10D. For example, the treater effluent removed from off-line treater 10A, 10B, 10C, or 10D during depressurization may be introduced into an adsorbent bed 50 (also referred to herein as 'silica bed 50') via a respective treater regeneration effluent line and flow path described further below with reference to treatment of the purge phase effluent of treater regeneration during an adsorption stage I of FIG. 2A.

The purge phase of treater regeneration can comprise introducing a treater purge gas (e.g., nitrogen) into the treater via inlet line 14A, 14B, 14C, or 14D and valve 13A, 13B, 13C, or 13D, respectively, and withdrawing a treater effluent comprising nitrogen and purged impurities via treater outlet line 210A, 210B, 210C, or 210D, respectively. Although depicted one way in FIG. 1, in aspects, a regenerating gas (e.g., the nitrogen gas introduced into an off-line treater during a purge phase, a heating phase, a holding phase, a cooling phase, or a combination thereof) passes through the desiccant in the off-line treater being regenerated from bottom to top, from top to bottom, or otherwise. Thus, in aspects, the regenerating gas passes through the desiccant in the off-line treater being regenerated from bottom to top. In other aspects, the regenerating gas may flow through the off-line treater from top to bottom. However, and without wishing to be limited by theory, regardless of the direction of the flow of the regenerating nitrogen gas through the desiccant bed inside the treater being regenerated, the flow of regenerating gas through the desiccant bed can be maintained low enough while still allowing for a uniform flow distribution of the regenerating gas comprising nitrogen across the desiccant bed.

According to this disclosure, a treater regeneration effluent stream produced during a purge phase of the off-line treater may be introduced into adsorbent bed 50 via the respective treater regeneration effluent line, as described further with reference to FIG. 2A hereinbelow. For example, during regeneration of off-line treater 10A, a purge phase treater effluent can be introduced into silica bed 50 via line 210A, valve 227A, line 221A, and line 55; during regeneration of off-line treater 10B, a purge phase treater effluent can be introduced into silica bed 50 via line 210B, valve 227B, line 221B, and line 55; during regeneration of off-line treater 10C, a purge phase treater effluent can be introduced into silica bed 50 via line 210C, valve 227C, line 221C, and line 55; during regeneration of off-line treater 10D, a purge phase treater effluent can be introduced into silica bed 50 via line 210D, valve 227D, line 221D, and line 55.

Adsorbent bed 50 is operable to remove contaminants from the treater bed effluent introduced thereto. Such contaminants include any of the impurities noted hereinabove as being removed via the treater bed. In embodiments, adsorbent bed 50 removes at least one contaminant, component, or impurity selected from hydrocarbons, water, carbon dioxide, methanol, ammonia, or a combination thereof Adsorbent bed 50 may selectively adsorb ethylene, isobutane, 1-hexene, 1-octene, 1-butene, or a combination thereof.

Adsorbent bed 50 can comprise a pressure swing adsorption unit. In embodiments, the adsorbent comprises silica gel. Although referred to herein as a silica bed, adsorbent bed 50 can, in embodiments, comprise another adsorber or pressure swing adsorber known to those of skill in the art. The silica within silica bed 50 can be of a size suitable for use at the flow rates desired for treater regeneration, and selection of a suitable size and shape of silica is within the skill of one in the art without undue experimentation. An example of a silica suitable for use in the present disclosure includes SORBEAD® H, available from BASF. SORBEAD® H is an alumino-silicate gel in the form of hard, spherical beads.

In aspects, the off-line treater can be regenerated using once-through nitrogen during the purge phase. For purposes of the disclosure herein the term "once-through nitrogen" means that the nitrogen is not in a circulation loop, and flows into and out of the off-line treater only once in continuous flow.

As noted above, during all or a portion of the depressurization phase, the purge phase, or both of regeneration of the off-line treater, the treater effluent withdrawn from the off-line treater 10A, 10B, 10C, or 10D via treater effluent outlet line 210A, 210B, 210C, or 210D, respectively, may be introduced via the respective flow path for the treater regeneration effluent stream into silica bed 50, whereby contaminants within the treater effluent can be adsorbed onto the silica bed(s) therein. For example, during a depressurization phase, a purge phase, or both of treater 10A, feed treater 10A is taken off-line by closing valves 103 and 105, valves 13A and 211A are opened, and nitrogen is introduced via line 14A, and treater effluent is withdrawn from feed treater 10A via treater regeneration effluent line 210A. Valve 227A can be opened and valve 215A closed (and, if present, a valve 252 closed and a valve 251 opened), and the treater effluent can be introduced via treater effluent line 210A, line 221A, and line 55 into silica bed 50. During a depressurization phase, a purge phase, or both of treater 10B, feed treater 10B is taken off-line by closing valves 106 and 109, valves 13B and 211B are opened, and nitrogen is introduced via line 14B, and treater effluent is withdrawn from feed treater 10B via treater regeneration effluent line 210B. Valve 227B can be opened and valve 215B closed (and, if present, a valve 252 closed and a valve 251 opened), and the treater effluent can be introduced via treater effluent line 210B, line 221B, and line 55 into silica bed 50. During a depressurization phase, a purge phase, or both of treater 10C, recycle treater 10C is taken off-line by closing valves 153 and 155, valves 13C and 211C are opened, and nitrogen is introduced via line 14C, and treater effluent is withdrawn from feed treater 10C via treater regeneration effluent line 210C. Valve 227C can be opened and valve 215C closed (and, if present, a valve 252 closed and a valve 251 opened), and the treater effluent can be introduced via treater effluent line 210C, line 221C, and line 55 into silica bed 50. During a depressurization phase, a purge phase, or both of treater 10D, recycle treater 10D is taken off-line by closing valves 157 and 159, valves 13D and 211D are opened, and nitrogen is introduced via line 14D, and treater effluent is withdrawn from feed treater 10D via treater regeneration effluent line 210D. Valve 227D can be opened and valve 215D closed (and, if present, a valve 252 closed and a valve 251 opened), and the treater effluent can be introduced via treater effluent line 210D, line 221D, and line 55 into silica bed 50. Nitrogen product having a reduced amount of contaminants than the treater bed effluent introduced into silica bed 50 is extracted from silica bed 50 via line 52 or a line 53. The nitrogen purity of the nitrogen product extracted from adsorbent bed 50 during introduction thereto of depressurization or purge phase treater effluent nitrogen can be greater than or equal to about 99.8, 99.9, or 99.98 mole percent.

Following depressurization and purge phases of treater regeneration, a heating phase of treater regeneration can commence. The heating phase of treater regeneration includes regenerating at least a portion of the desiccant in the off-line treater (feed treater 10A or 10B which is off-line, recycle treater 10C or 10D which is off-line, or another off-line treater) using nitrogen gas to yield a heating phase treater regeneration effluent stream comprising nitrogen, and this treater effluent stream is sent to flare or other destruction device, such as, without limitation, a thermal oxidizer. In aspects, the off-line treater can be regenerated using once-through nitrogen during the heating phase.

In the step of heating, the temperature within the off-line treater may be heated to a temperature in the range of 400° F. (204° C.) to 600° F. (316° C.) so as to remove impurities from the desiccant bed(s) in the off-line treater. Any heating system known in the art such as a heat exchanger, an electric heater, or a combination thereof connected in series may be employed. Examples of a heating system are found in U.S. Pat. Nos. 2,625,915 and 3,585,971, each of which is incorporated herein by reference in its entirety.

In aspects, during the heating phase, a temperature of the off-line treater 10A, 10B, 10C, or 10D being regenerated can be increased from a temperature of about 150° F. (66° C.) or lower, to a temperature of regeneration (e.g., about 400° F. (204° C.) to 600° F. (about 316° C.)). During the heating phase of treater regeneration, a rate of flow of the regeneration gas comprising nitrogen through the off-line treater can be from about 2% to about 75%, alternatively from about 5% to about 50%, alternatively less than about 50%, alternatively less than about 40%, alternatively less than about 30%, alternatively less than about 29%, alternatively less than about 25%, or alternatively less than about 20%, of a fluidization velocity of the desiccant. As will be appreciated by one of skill in the art, and with the help of this disclosure, the rate of flow of the regenerating gas comprising nitrogen through the off-line treater should not exceed the fluidization velocity of the desiccant, and should be held low enough to insure no carryover of desiccant into downstream piping/apparatus.

The nitrogen gas passes through the desiccant (e.g., in one or more desiccant beds) of the off-line treater 10A, 10B, 10C, or 10D being regenerated during the heating phase as the temperature increases to the temperature of regeneration, e.g., a temperature in the range of from about 400° F. (204°

C.) to about 600° F. (about 316° C.), from about 450° F. (about 232° C.) to about 550° F. (about 288° C.), or from about 450° F. (about 232° C.) to about 600° F. (about 316° C.). The pressure of the off-line treater may increase as the temperature increases, and the regeneration pressure includes a pressure in the range of about 50 psig (0.34 MPag) to about 850 psig (about 5.86 MPag), about 50 psig (0.34 MPag) to about 700 psig (about 4.83 MPag), about 50 psig (0.34 MPag) to about 600 psig (about 4.14 MPag), about 75 psig (0.52 MPag) to about 400 psig (about 2.76 MPag), about 100 psig (0.69 MPag) to about 200 psig (about 1.38 MPag), about 100 psig (0.69 MPag) to about 150 psig (about 1.03 MPag), or about 120 psig (about 0.83 MPag). In aspects, a treater regeneration pressure includes a pressure in the range of about 600 psig (about 4.14 MPag) to about 850 psig (about 5.86 MPag), about 700 psig (about 4.83 MPag) to about 825 psig (about 5.69 MPag), or about 750 psig (about 5.17 MPag) to about 800 psig (about 5.52 MPag).

Once the temperature of regeneration is reached in the off-line treater being regenerated, the method of regenerating the desiccant in the off-line treater may enter a holding phase followed by a cooling phase, the method may enter directly to the cooling phase without a holding phase, or the method may enter into the cooling phase followed by a holding phase.

In the holding phase before the cooling phase, the temperature of the off-line treater being regenerated may be maintained at the regeneration temperature for a period of time. For example, the temperature may be maintained for about 0.25, 0.5, 1, 2, 3, 4, 5, 6, 7, 8, 9, or 10 hours or more. In embodiments, the temperature can be maintained during the holding phase for a period of time of about 2 hours. During the holding phase, the nitrogen gas may continue to pass though the desiccant and out of the off-line treater, or flow of the nitrogen gas through the off-line treater may be stopped. In embodiments of the holding phase which continue the flow of nitrogen gas through the off-line treater, heating may continue in order to maintain the temperature of the off-line treater at the regenerating temperature. In embodiments, the holding phase comprises maintaining the off-line treater at the regeneration (or other) temperature (e.g., in the range of 400° F. (204° C.) to 600° F. (316° C.), alternatively 425° F. (218° C.) to 575° F. (302° C.), or alternatively 450° F. (232° C.) to 550° F. (288° C.)), using nitrogen on a once-through basis.

Once the off-line treater enters the heating phase, treater effluent may no longer be introduced into silica bed 50. For example, once off-line feed treater 10A enters the heating phase, valve 211A may be closed and valve 213A opened, whereby treater effluent produced during the heating phase, the holding phase, or both is removed from treater 10A via line 212A. When off-line feed treater 10B enters the heating phase, valve 211B may be closed and valve 213B opened, whereby treater effluent produced during the heating phase, the holding phase, or both is removed from treater 10B via line 212B. When off-line feed treater 10C enters the heating phase, valve 211C may be closed and valve 213C opened, whereby treater effluent produced during the heating phase, the holding phase, or both is removed from treater 10C via line 212C. When off-line feed treater 10D enters the heating phase, valve 211D may be closed and valve 213D opened, whereby treater effluent produced during the heating phase, the holding phase, or both is removed from treater 10D via line 212D. The treater effluent of the heating phase, the holding phase, or both removed via line 212A-D may be subjected to destruction, e.g., via flaring.

Although indicated as exiting treater 10A, 10B, 10C, an 10D via the bottom thereof in the embodiment of FIG. 1, lines 212A, 212B, 212C, or 212D may withdraw treater effluent from a top thereof, in other aspects.

In aspects, a heating or holding phase of treater regeneration is followed by a cooling phase of the off-line treater being regenerated. In a cooling phase which is performed directly after the heating phase or after the holding phase, the method for regenerating the off-line treater can include, for example, thermosyphoning with nitrogen, in a closed-convection loop of the off-line treater to cool the off-line treater to a temperature of less than or equal to about 100° F. (38° C.) to 150° F. (66° C.). Such thermosyphoning is described in U.S. Patent Pub. No. 2017/0232422 entitled Treater Regeneration, the disclosure of which is hereby incorporated herein in its entirety for purposes not contrary to this disclosure. In aspects, cooling is performed while employing (e.g., a cooled) nitrogen flow. In aspects, the off-line treater can be cooled (e.g., to ambient temperature) with once-through nitrogen during the cooling phase. The pressure of the off-line treater can be maintained during the cooling phase of treater regeneration at a desired cooling phase pressure, which may be the same as the pressure utilized during one or more of the depressurization, purging, and heating phases.

For cooling of off-line treater 10A, valves 211A and 215A are opened, and valves 213A, 227A and 251 closed, such that treater bed effluent during (at least a portion of) the cooling phase can be introduced into silica bed 50 via lines 210A, 220A, and 52. For cooling of off-line treater 10B, valves 211B and 215B are opened, and valves 213B, 227B and 251 closed, such that treater bed effluent during the cooling phase can be introduced into silica bed 50 via lines 210B, 220B, and 52. For cooling of off-line treater 10C, valves 211C and 215C are opened, and valves 213C, 227C and 251 closed, such that treater bed effluent during the cooling phase can be introduced into silica bed 50 via lines 210C, 220C, and 52. For cooling of off-line treater 10D, valves 211D and 215D are opened, and valves 213D, 227D and 251 closed, such that treater bed effluent during the cooling phase can be introduced into silica bed 50 via lines 210D, 220D, and 52. In aspects, only a portion of the off-line treater bed effluent produced during the cooling phase of a treater (e.g., the first ten minutes of the cooling phase duration) is passed through silica bed 50. As discussed further hereinbelow with reference to FIG. 2C, valves 215A, 215B, 215C, and 215D may be operable to reduce the pressure of the treater bed effluent prior to introduction thereof into silica bed 50.

During the cooling phase, any heater(s) utilized during the heating phase can be shut off. The cooling medium can either flow through a shut-off electric heater(s), or can bypass the shut-off heater(s) and flow into the off-line treater. During the cooling phase of treater regeneration, cooling medium (e.g., nitrogen) may be introduced into the off-line treater at a temperature in the range of from about 38° C. to about 42° C., or ambient or room temperature; a pressure in the range of from about 35 to about 45 psia (from about 241 to about 310 kPa; or a combination thereof.

During the cooling phase, a rate of flow of the regeneration gas comprising nitrogen through the off-line treater can be from about 2% to about 75%, alternatively from about 5% to about 50%, alternatively less than about 50%, alternatively less than about 40%, alternatively less than about 30%, alternatively less than about 29%, alternatively less than about 25%, or alternatively less than about 20%, of a fluidization velocity of the desiccant. As will be appreciated by one of skill in the art, and with the help of this disclosure, the rate of flow of the regenerating gas comprising nitrogen through the off-line treater should not exceed (i.e., is maintained less than) the fluidization velocity of the desiccant, and should be held low enough to insure no carryover of desiccant into downstream piping/apparatus.

In aspects, treater effluent produced during the cooling phase is introduced into silica bed 50, as described further with reference to FIG. 2C below. For example, during a cooling phase of treater 10A, feed treater 10A is taken off-line by closing valves 103 and 105, valves 13A and 211A are opened, and nitrogen is introduced via line 14A, and treater effluent is withdrawn from feed treater 10A via treater regeneration effluent line 210A. Valve 215A can be opened and valve 227A closed (and, if present, a valve 251 closed and a valve 252 opened), and the treater effluent can be introduced via treater effluent line 210A, line 220A, and line 52 into silica bed 50. During a cooling phase of treater 10B, feed treater 10B is taken off-line by closing valves 106 and 109, valves 13B and 211B are opened, and nitrogen is introduced via line 14B, and treater effluent is withdrawn from feed treater 10B via treater regeneration effluent line 210B. Valve 215B can be opened and valve 227B closed (and, if present, a valve 251 closed and a valve 252 opened), and the treater effluent can be introduced via treater effluent line 210B, line 220B, and line 52 into silica bed 50. During a cooling phase of treater 10C, recycle treater 10C is taken off-line by closing valves 153 and 155, valves 13C and 211C are opened, and nitrogen is introduced via line 14C, and treater effluent is withdrawn from feed treater 10C via treater regeneration effluent line 210C. Valve 215C can be opened and valve 227C closed (and, if present, a valve 251 closed and a valve 252 opened), and the treater effluent can be introduced via treater effluent line 210C, line 220C, and line 52 into silica bed 50. During a cooling phase of treater 10D, recycle treater 10D is taken off-line by closing valves 157 and 159, valves 13D and 211D are opened, and nitrogen is introduced via line 14D, and treater effluent is withdrawn from feed treater 10D via treater regeneration effluent line 210D. Valve 215D can be opened and valve 227D closed (and, if present, a valve 251 closed and a valve 252 opened), and the treater effluent can be introduced via treater effluent line 210D, line 220D, and line 52 into silica bed 50. A tail gas comprising a reduced amount of contaminants than the treater bed effluent introduced into silica bed 50, a nitrogen product having high nitrogen purity, or both can be extracted from silica bed 50 via line 55 or a line 56. For example, tail gas may be removed from the silica bed for the first 10, 20, 30, 40, 50, 60, or more minutes of a cooling phase of treater regeneration, while a nitrogen product comprising high purity may be removed therefrom after this time (i.e., once all the impurities have desorbed from silica bed 50, assuming the cooling phase treater effluent nitrogen comprises minimal impurities). The nitrogen purity of the nitrogen product extracted from adsorbent bed 50 following purging thereof can be greater than or equal to about 99.8, 99.9, or 99.98 mole percent.

In aspects, treater regeneration comprises a holding phase after the cooling phase, during which the temperature of the off-line treater being regenerated may be maintained at the cooled temperature for a period of time. For example, the temperature may be maintained for less than 1 hour, or for about 1, 2, 3, 4, 5, 6, 7, 8, 9, 10, 11, 12, 13, 14, 15, 16, 17, 18, 19, 20 or more hours.

Regeneration of treaters 10A, 10B, 10C and 10D reduces the amount of the one or more impurities in the treaters 10A, 10B, 10C, and 10D. The present disclosure contemplates the amount of impurities may be measured and monitored in stream 104 for feed treater 10A, in stream 108 for feed treater 10B, in stream 154 for recycle treater 10C, in stream 158 for recycle treater 10D, or a combination thereof, and regeneration performed when the amount of impurities therein reaches or exceeds a certain level. In aspects, the desired level may be less than 100, 90, 80, 70, 60, 50, 40, 30, 20, 10, 9, 8, 7, 6, 5, 4, 3, 2, 1, or less ppm based on weight of the stream. Impurity levels may be measured using techniques known in the art with the aid of this disclosure, for example, high performance liquid chromatography (HPLC), gas chromatography (GC), or Raman spectroscopy. The impurities may be measured in an online apparatus in streams 104, 108, 150, 154, or a combination thereof, or a sample may be taken from any of streams 104, 108, 154, 158, or a combination thereof, and subsequently analyzed for impurity concentration.

After regeneration, the off-line treater can remain in stand-by mode until the other of the pair of treaters needs regeneration. Alternatively, after regeneration, the off-line treater is brought on-line without any stand-by. To take treater 10A on-line, valves 103 and 105 are moved to the open position (and valves 211A and 213A closed). To take treater 10B on-line, valves 107 and 109 are moved to the open position (and valves 211B and 213B closed). To take treater 10C on-line, valves 153 and 155 are moved to the open position (and valves 211C and 213C closed). To take treater 10D on-line, valves 157 and 159 are moved to the open position (and valves 211D and 213D closed).

Hydrocarbons such as ethylene, isobutane, and 1-hexene are preferably adsorbed on silica gel, even at very low partial pressure. The equilibrium loading follows the order: ethylene<isobutane<1-hexene. By introducing the treater effluent (e.g., from a purge phase nitrogen stream, a cooling phase nitrogen stream, or both) to a silica bed, hydrocarbon therein can be selectively adsorbed on the silica from the purge phase treater effluent during an adsorption stage I (and optionally from a cooling phase treater effluent during a first regeneration stage III, as discussed further below), and nitrogen can be recovered as a high purity product. When the silica bed is saturated, it can be regenerated at a lower pressure, with nitrogen purge gas flow. The nitrogen purge gas flow utilized for silica bed regeneration may be provided by a cooling phase treater bed effluent stream, in embodiments. The silica bed may operate as a pressure swing adsorption (PSA) process. In aspects, no compression of the PSA feed (e.g., the treater bed effluent) is needed, and a single silica bed or column may be sufficient to treat the purge gas produced by 1, 2, 3, 4, 5, 6, or all of the hydrocarbon treaters of a polymer plant during treater regeneration. Since iosbutane and 1-hexene have higher equilibrium capacity on silica than that of ethylene, a single silica bed designed to accommodate ethylene content may be oversized for isobutane and 1-hexene, and the same silica bed may be able to recover purge step nitrogen from isobutane and 1-hexene treaters, with the same regeneration process stages utilized for the ethylene treater. The silica bed can thus be designed, in aspects, to accommodate the ethylene content during the entire treater regeneration purge phase (typically 2.5 hours), and therefore be capable of handling the treater effluent(s) produced during the purge phase of regeneration of other treaters, for example, one or more comonomer (e.g., 1-hexene) treaters, one or more diluent (e.g., isobutane) treaters, one or more olefin-free diluent (e.g., olefin-free isobutane) treaters, or a combination thereof. Once the hydrocarbon treater being regenerated switches to the heating step, the silica bed can be moved to a depressurization stage II (usually being depressurized in minutes). The silica bed can then be idled until the hydrocarbon treater being regenerated enters the cooling phase. The cool down nitrogen can then be used to purge the silica bed during a first regeneration stage III to remove previously adsorbed hydrocarbons. As will be illustrated in more detail below, depending on the purge nitrogen flow rate, the duration of the purge step of the silica bed can be less than one hour, in aspects. As silica is reported to have capacity for polar molecules such as $CO_2$, water, ammonia etc., should the cool down nitrogen stream contain such components, same may also be retained by the silica bed. This means the majority of the treater bed regeneration cool down phase nitrogen can also be recovered as high purity nitrogen product (as this cool down step usually lasts for over 20 hours). After the purge step of first regeneration stage III, the silica bed is optionally purged with fresh nitrogen in a second regeneration stage IV for a period to remove any poisons previously adsorbed during the cool down nitrogen recovery step of first regeneration stage III. The silica bed can then be repressurized in a repressurization stage V in preparation for a next purification cycle.

Operation and regeneration of silica bed 50 will now be made with reference to FIGS. 2A-2E, which are schematics of silica bed 50 during operation and regeneration thereof in a PSA process for nitrogen recovery during hydrocarbon treater bed regeneration. Specifically, FIG. 2A depicts an adsorption stage I of silica bed 50, FIG. 2B depicts a depressurization stage II of silica bed 50, FIG. 2C depicts a first regeneration stage III of silica bed 50, during which hydrocarbons are removed, FIG. 2D depicts an optional second regeneration stage IV of silica bed 50, during which any poisons adsorbed during the first regeneration stage III of FIG. 2C can be removed, and FIG. 2E depicts a repressurization stage V of silica bed 50. Each of these stages of silica bed 50 will now be described in more detail.

As noted above, during the depressurization phase, the purge phase, or both of regeneration of a treater bed, all or a portion of the treater bed effluent can be introduced into silica bed 50. During the adsorption stage I of silica bed 50, adsorbent within silica bed 50 adsorbs impurities from a treater bed effluent produced during the depressurization phase, the purge phase, or both of treater bed regeneration. During the purge phase of a treater bed, nitrogen is introduced into the treater 10 (e.g., feed treater 10A or 10B or recycle treater 10C or 10D of FIG. 1) via line 14 (e.g., line 14A, 14B, 14C, or 14D of FIG. 1, respectively). Treater bed effluent comprising nitrogen and impurities removed from treater bed 10 via the purge thereof is extracted from treater 10 via treater bed outlet line 210 (e.g., line 210A, 210B, 210C, or 210C, respectively, of FIG. 1).

The treater bed effluent obtained during the purge phase of a treater bed may have a pressure in the range of from about 35 to about 45 psia (from about 241 to about 310 kPa), a temperature in the range of from about −46° C. to about 25° C., or a combination thereof. The treater bed effluent may contain one or more impurities selected water, carbon dioxide, carbon monoxide, alcohols, acetylene, carbonyls, sulfur compounds, peroxides, ammonia, amines, phosphines, oxygen, or combinations thereof. In aspects, the treater bed effluent removed via line 210 during the purge phase comprises hydrocarbons.

The treater bed effluent in line 210 is introduced into silica bed 50 (e.g., via the treater effluent flow paths discussed hereinabove with reference to FIG. 1). During the adsorption stage of operation of silica bed 50, impurities in the treater bed effluent introduced thereto are adsorbed onto the adsorbent (e.g., silica gel) within silica bed 50. Nitrogen product comprising purified nitrogen having a greater purity than that of the treater bed effluent introduced thereto is removed from silica bed 50 via line 52/53. That is, in embodiments, valving can be operated (e.g., a valve 251 opened, a valve 252 closed, and valves 215A, 215B, 215C, and 215D closed) such that nitrogen product can be removed via a line 52 which line may also be operated (e.g., during a regeneration stage of FIG. 2C) for introduction of treater bed effluent into silica bed 50; in other aspects, a dedicated line 53 may be operable for removal of nitrogen product from silica bed 50 during adsorption I. In aspects, such as that depicted in FIG. 2A, the treater bed effluent obtained during at least a portion of a depressurization phase, a purge phase, or both of a treater bed regeneration cycle is introduced into the bottom of silica bed 50, and nitrogen product removed from a top thereof. In other aspects, the treater bed effluent obtained during at least a portion of a depressurization phase, a purge phase, or both a depressurization phase and a purge phase of a treater bed regeneration cycle is introduced into the top of silica bed 50, and nitrogen product removed from a bottom thereof.

The direction of flow through silica bed 50 during adsorption stage I, optional second regeneration stage IV, repressurization stage V, or a combination thereof, can be opposite that of the flow therethrough during first regeneration stage III, depressurization stage II, or both.

The nitrogen product removed from silica bed 50 during adsorption may have a purity of greater than or equal to about 99.9, 99.99, or 99.999%, depending on the flow rate therethrough and the duration thereof. The nitrogen product may be utilized as a purge gas for the purge column 410A of a closed-loop nitrogen transport system 400A or 400B, as described hereinbelow with reference to FIGS. 3 and 4, respectively, vented directly to the atmosphere, or a combination thereof.

Upon completion of the purge phase of regeneration of the off-line treater bed, the treater bed enters the heating phase, as discussed hereinabove. During the heating phase of regeneration of the treater bed 10, silica bed 50 may be regenerated and prepared for further adsorption of impurities. Should the capacity of silica bed 50 allow, however, once a treater bed enters a heating phase, treater bed effluent from a depressurization phase, a purge phase, or both of another off-line treater may be introduced into silica bed 50. Such may occur, for example, when one of the feed treaters 10A and 10B and one of the recycle treaters 10C and 10D or another treater bed are off-line for regeneration simultaneously.

In aspects, once the treater bed enters the heating phase, silica bed 50 is depressurized, as depicted in FIG. 2B. During depressurization stage II of silica bed 50, the pressure within silica bed 50 may be reduced to a pressure of a few psig (e.g., 5 psig), or a pressure in the range of from about 3 to about 20 psig (from about 20 to about 138 kPa), or from about 5 to about 20 psig (from about 34 to about 138 kPa). During depressurization, a silica bed effluent comprising nitrogen product may be removed from silica bed 50 via line 55 or 56. That is, in aspects, valving can be operated (e.g., a valve 252 opened, a valve 251 closed, and valves 227A, 227B, 227C, and 227D closed) such that nitrogen product can be removed via a line 55 which line may also be operated (e.g., during the adsorption stage of FIG. 2A) for introduction of treater bed effluent into silica bed 50; in other aspects, a dedicated line 56 may be operable for removal of nitrogen product from silica bed 50 during depressurization. The nitrogen product extracted from silica bed 50 during depressurization may comprise nitrogen that was within the pores of the adsorbent within silica bed 50, for example. Depressurization of silica bed 50 will generally occur over a shorter time than the heating phase or combined heating and holding phases of an off-line treater bed 10. Accordingly, silica bed 50 can be depressurized during the heating phase, the holding phase, or both the heating phase and the holding phase of an off-line treater bed 10.

The nitrogen product removed from silica bed 50 during depressurization may have a purity of greater than or equal to about 99.9, 99.99, or 99.999 mole percent.

Following depressurization of silica bed 50, silica bed 50 can be idled until off-line treater bed 10 enters the cooling phase, at which time cooldown nitrogen treater effluent can be utilized to purge the silica bed and remove previously adsorbed hydrocarbons during a first regeneration (regeneration/remove hydrocarbons) stage III. During the cooling phase of a treater bed, nitrogen is introduced into the treater 10 (e.g., feed treater 10A or 10B or recycle treater 10C or 10D of FIG. 1) via line 14 (e.g., line 14A, 14B, 14C, or 14D of FIG. 1, respectively). Treater bed effluent comprising nitrogen and any impurities removed from treater bed 10 via the cooldown nitrogen is extracted from treater 10 via treater bed outlet line 210 (e.g., line 210A, 210B, 210C, or 210C, respectively, of FIG. 1).

The treater effluent obtained during the cooling phase of off-line treater 10 may pass through a valve V1, wherein the pressure may be reduced to a desired pressure prior to introduction of the treater bed effluent into silica bed 50 via line 52.

As the treater may be substantially regenerated after the heating phase, the treater effluent produced during the cooling phase of the treater and introduced into silica bed 50 as per FIG. 2C may not comprise substantial impurities, and can, in aspects, be utilized to regenerate silica bed 50. During regeneration of silica bed 50, a tail gas can be extracted via line 55 or 56 (see FIG. 1). As this tail gas contains impurities (e.g., hydrocarbons, such as ethylene) which have desorbed from the adsorbent within silica bed 50, the tail gas has enriched hydrocarbon content relative to the treater bed effluent, and can be flared with a reduced amount of added fuel gas, and reduced NOx emissions. Once the nitrogen purity of the silica bed effluent is above a desired value (i.e., once the silica bed has been purged), the nitrogen product removed via line 55 or 56 may be recycled or utilized elsewhere in the polymerization process. The tail gas may comprise at least one, two, or three times the mole content of the purge phase treater regeneration effluent stream, in embodiments. The nitrogen purity of the nitrogen product extracted from adsorbent bed 50 following purging thereof can be greater than or equal to about 99.8, 99.9, or 99.98 mole percent.

Regeneration of silica bed 50 may further comprise a regeneration/remove poisons stage IV, as depicted in FIG. 2D. As the treater bed effluent introduced into silica bed 50 during the cooling phase of treater bed regeneration should typically comprise a low level of contaminants, a stage IV may not be needed. However, in aspects, once the cooling phase of treater bed regeneration or the purge of silica bed 50 has completed, the silica bed may be isolated from the (now regenerated) treater, and fresh nitrogen may be introduced, for example via line 55 or a line 57, into silica bed 50. During optional second regeneration stage IV, tail gas removed from silica bed 50 via line 52 or 53 may be disposed of, such as via flaring.

Once silica bed 50 has been regenerated (e.g., via depressurization stage II, regeneration/remove hydrocarbons stage III, and optional regeneration/remove poisons stage IV), silica bed 50 may be repressurized in repressurization stage V. Repressurization stage V may comprise introducing fresh nitrogen via line 55 or 57 into silica bed 50. Once back to a desired operating pressure, silica bed 50 may be utilized to adsorb impurities from another treater bed effluent produced during regeneration of an off-line treater. If a second regeneration stage IV is not utilized/needed (e.g., the cooldown nitrogen treater effluent is substantially poison-free or at acceptable levels), stages IV and V may be optional. In such aspects, following the initial period (e.g., ten minutes) of the silica bed purge of stage III, the cooldown nitrogen treater effluent may not be let down to a lower pressure (e.g., 20 psia), and silica bed 50 can be repressurized, for example, with this cooldown nitrogen.

In the polyolefin production systems disclosed herein, various system components can be in fluid communication via one or more conduits (e.g., pipes, tubing, flow lines, etc.) suitable for the conveyance of a particular stream, for example as shown in detail by the numbered streams in FIG. 1. For purposes of the disclosure herein, the description of a particular component (e.g., stream, vessel, reactor, section, system, or any component thereof) present, referenced, or both in one or more Figures is generally applicable across any Figures where the component is present, referenced, or both, unless stated otherwise. For example, the description of the feed treaters 10A, 10B or any components thereof is applicable to any of the FIGS. 1 and 2A-2E unless stated otherwise. As another example, the description of the recycle treaters 10C, 10D or any components thereof is applicable to any of the FIGS. 1, and 2A-2E unless stated otherwise.

The disclosure contemplates that the polyolefin production and treater regeneration process shown in FIG. 1, the treater regeneration and silica bed operation and regeneration system depicted in FIGS. 2A-2E, or both can include equipment such as storage tanks (e.g., for storing monomer, comonomer, diluent, and catalyst), accumulators, valves, pipes, pumps, heat exchangers, agitators, injection apparatus, flow meters, measurement equipment, control system, or combinations thereof which are not illustrated in FIG. 1 or FIGS. 2A-2E for purposes of clarity.

While the current disclosure is discussed in detail in the context of the treater regeneration system of FIGS. 2A-2E (comprising an adsorbent bed (e.g., silica bed 50) downstream of an off-line treater being regenerated) being part of a polyolefin production system, such as the polyolefin production system displayed in FIG. 1, it should be understood that the treater regeneration system as displayed in FIGS. 2A-2E can be used for the regeneration of any suitable treater, whether the treater is part or not of a polyolefin production system. For example, the treater regeneration system and method described herein as depicted in FIGS. 2A-2E can be used for the regeneration of a deethanizer overhead treater.

The disclosed treater regeneration systems and processes, which utilize a downstream silica bed as per this disclosure, can advantageously display improvements in one or more system characteristics, process characteristics, or both when compared to otherwise similar systems, processes, or both used in conventional treater regeneration processes. The method of regenerating a desiccant in an off-line treater of a polyolefin production process as disclosed herein can advantageously allow for nitrogen conservation and reduced emissions when compared to conventional systems absent the adsorbent bed (e.g., silica bed 50) downstream of the off-line treater.

Nitrogen usage during treater regeneration can be substantial and costly, and spent nitrogen sent to flare can create emissions, such as $CO_2$, carbon monoxide (CO), nitrogen oxides ($NO_x$), and the like. A treater regeneration system and method of this disclosure comprising an adsorbent bed (e.g., a PSA loaded with silica gel) downstream of an off-line treater, which selectively adsorbs hydrocarbons from the treater effluent stream(s) produced during treater regeneration, enables for a reduction in nitrogen consumption (improved nitrogen efficiency due to reuse of purified nitrogen) and flaring (along with reduced fuel gas and steam costs associated with such flaring due to enriched hydrocarbon content of various flared streams). This may enable reduced NOx and emissions fees, and concomitant economic benefit. Using less nitrogen reduces the nitrogen supply burden for modern polyolefin production processes, which saves costs and frees nitrogen supply for other uses in the polyolefin production process.

The method of regenerating a desiccant in an off-line treater of a polyolefin production process as disclosed herein can advantageously reduce nitrogen sent to flare or other disposal during treater regeneration by greater than or equal to 90%, alternatively by greater than or equal to 95%, or alternatively by greater than or equal to 99%, when compared to conventional once-through nitrogen regeneration systems, nitrogen recycle regeneration systems, or both absent a downstream silica bed of this disclosure. Additional advantages of the systems, processes, or both for regenerating a desiccant in an off-line treater of a polyolefin production process as disclosed herein can be apparent to one of skill in the art viewing this disclosure.

During the production of polymer (e.g., polyethylene), polymer fluff is transported between vessels (e.g., between a purge column and an extruder feed tank). Closed-loop nitrogen transfer systems can be utilized for this transport. In a closed-loop transport system, the conveying nitrogen is recycled, and hydrocarbon (e.g., hexene-1, volatile organic carbons (VOCs)) that builds up in the nitrogen is generally reduced by purging the nitrogen. The purged nitrogen flow is controlled in order to keep the hydrocarbon levels (e.g., hexene) within a desired range. The desired range may be, for example, less than 2000 ppm, 2600 ppm, or 3000 ppm, or in the range of from 50 to 10,000 ppm, or from 1,000 to 2600 ppm. The purged nitrogen is typically combined with natural gas and flared. As the mixture of nitrogen and natural gas must have a minimum heating value (e.g., 300 BTU/ft$^3$) in order to adequately combust in a vertical flare stack, substantial quantities of natural gas (e.g., 3.6 million pounds/yr), as well as nitrogen (e.g., 8 million pounds/year) may be utilized for large plants (e.g., a 300 MTA plant). In addition to the costs for the nitrogen and natural gas, gas emissions permits and flare designs for low NOx can be concerns. Other flare streams (e.g., nitrogen purge streams from isobutane nitrogen recovery units or INRUs) provide similar concerns. In embodiments according to this disclosure, a treatment unit or pair of treatment units is utilized to remove hydrocarbons from a nitrogen gas stream, a conventionally flared stream, or both in a closed-loop nitrogen conveyance or transport system.

Figure 3:
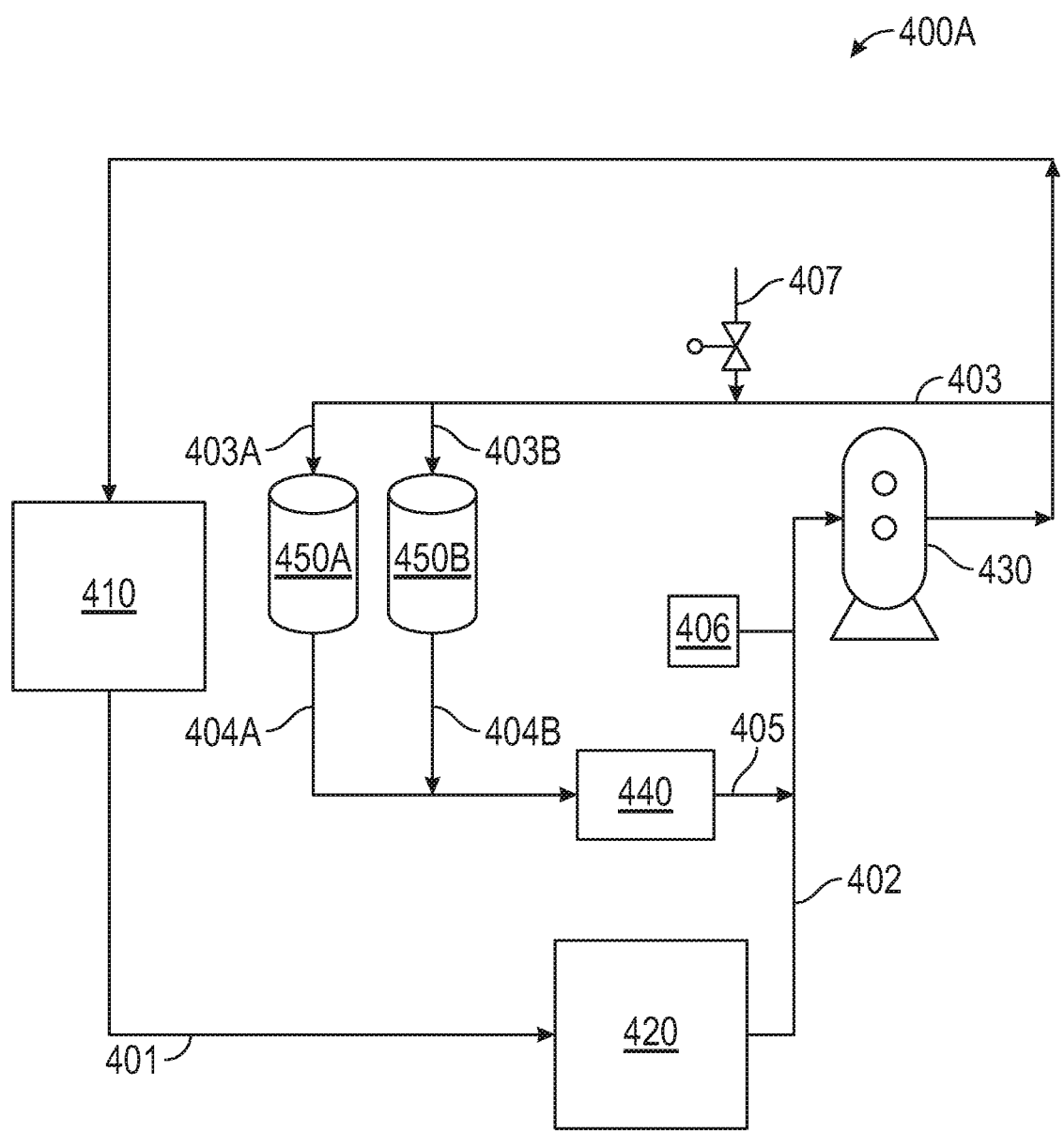
FIG. 3 illustrates a configuration of a closed-loop nitrogen transport system 400A which may be utilized to conserve nitrogen during transport of polymer fluff.

Description of a nitrogen transport system and method comprising a treatment unit according to aspects of this disclosure will now be made with reference to FIG. 3. Closed-loop nitrogen transport system 400A comprises a first transfer line 401 configured for nitrogen pressure conveyance of a polymer fluff from at least one upstream vessel 410 to at least one downstream vessel 420, a second transfer line 402 configured to return a nitrogen gas stream comprising primarily nitrogen from at least one downstream vessel 420 to at least one upstream vessel 410, a conveyor blower 430 operable to provide flow throughout the closed loop, and at least one treatment unit 450A/450B operable to remove hydrocarbons from at least a portion of the nitrogen gas stream comprising primarily nitrogen, to provide a purified nitrogen stream.

A polymer fluff present in upstream vessel 410 is transported via first transfer line 401 to downstream vessel 420. As discussed in more detail with reference to FIG. 4, the at least one upstream vessel 410 can comprise a purge column downstream of one or more polymerization reactors and configured to separate a purge gas from a polymer fluff introduced thereto, an isobutane nitrogen recovery unit (INRU) fluidly connected with the purge column and configured to separate a nitrogen-containing gas from the purge gas, or both.

Once the polymer fluff is transported to downstream vessel 420 via first transfer line 401, nitrogen gas is separated from the polymer fluff and a nitrogen gas stream comprising primarily nitrogen is transported back to upstream vessel 410 via second transfer line 402. A conveyor blower 430 or other apparatus known in the art may be utilized to provide motive force throughout the closed loop, and drive a portion of the conveying nitrogen in second transfer line 402 to an online treatment unit 450A or 450B via a spillback line 403. In embodiments, spillback line 403 is downstream (e.g., on the discharge side) of conveyor blower 430.

In aspects, the nitrogen flow in spillback line 403 is in the range of from about 250 to about 5,000 kg/h, from about 500 to about 3,000 kg/h, or from about 1,000 to about 2,000 kg/h. In aspects, the nitrogen flow in spillback line 403 comprises from about 10 to about 25 weight percent of the nitrogen gas flow in second transfer line 402 exiting downstream vessel 420. For example, the nitrogen flow in second transfer line 402 may be in the range of from 8,000 to 10,000 kg/h nitrogen, and the flow introduced into the online treatment unit 450A or 450B via spillback line 403 and 403A or 403B, respectively, may be in the range of from about 1,000 to 2,000 kg/h nitrogen. The gas comprising nitrogen in second transfer line 402 can comprise from about 1 to about 100 kg/h, from about 1 to about 50 kg/h, or from about 2 to 21 kg/h hydrocarbons (e.g., hexene-1).

Spillback line 403 on the discharge side of blower 430 may be utilized to introduce a portion of the nitrogen gas stream comprising primarily nitrogen in second transfer line 402 into treatment unit(s) 450A/450B. In aspects, a majority of the nitrogen flow in second transfer line 402 is not diverted to treatment, and returns to upstream vessel 410 to pick up more polymer fluff to be transported. In aspects, the at least one downstream vessel comprises an extruder feed hopper, an extruder, a fluff storage vessel, or a combination thereof, as described in more detail hereinbelow with reference to FIG. 4.

A closed-loop nitrogen transport system can comprise at least two treatment units 450. Closed-loop nitrogen transport system 400A comprises two treatment units, units 450A and 450B, whereby one of the at least two treatment units can be online removing hydrocarbons from the spillback stream while another of the at least two treatment units is off-line being regenerated or otherwise prepared for service or waiting to be returned to service. Generally, one of two treatment units 450A or 450B will be online while the other treatment unit is off-line, being regenerated or idled. In aspects, the treatment unit comprises an adsorbent bed, a membrane-based separation unit, a catalytic converter, a refrigeration unit, pressurized (e.g., high pressure) oil absorption unit, or a combination thereof. The adsorbent bed can comprise a polymeric adsorbent, silica, activated charcoal, zeolite molecular sieve, or a combination thereof. In aspects, the treatment comprises a pressure swing adsorption (PSA) unit, as known in the art. Such a PSA is described in U.S. Pat. No. 5,346,536, the disclosure of which is hereby incorporated herein by reference in its entirety for purposes not contrary to this disclosure. Suitable polymeric adsorbent is described in *Back To Basics Adsorption Basics*: Part 2, pp. 38-45, by Alan Gabelman PE, CEP, August 2017.

Within the online treatment unit, hydrocarbons in the spillback stream introduced into the online treatment unit are adsorbed or otherwise removed therein from the spillback stream, and a purified nitrogen stream is removed from the online treatment unit via line 404A or 404B, respectively, and returned to second transfer line 402 via purified nitrogen line 405. The nitrogen purity in the purified nitrogen stream removed via line 404A or 404B may be greater than 99.9, 99.99, or 99.995 wt % pure nitrogen, and may comprise less than or equal to about 1,000, 100, or 50 ppm hydrocarbons. The purified nitrogen return line 405 can be configured to introduce the purified nitrogen stream into second transfer line 402 upstream (e.g., on the suction side) of conveyor blower 430.

Figure 4:
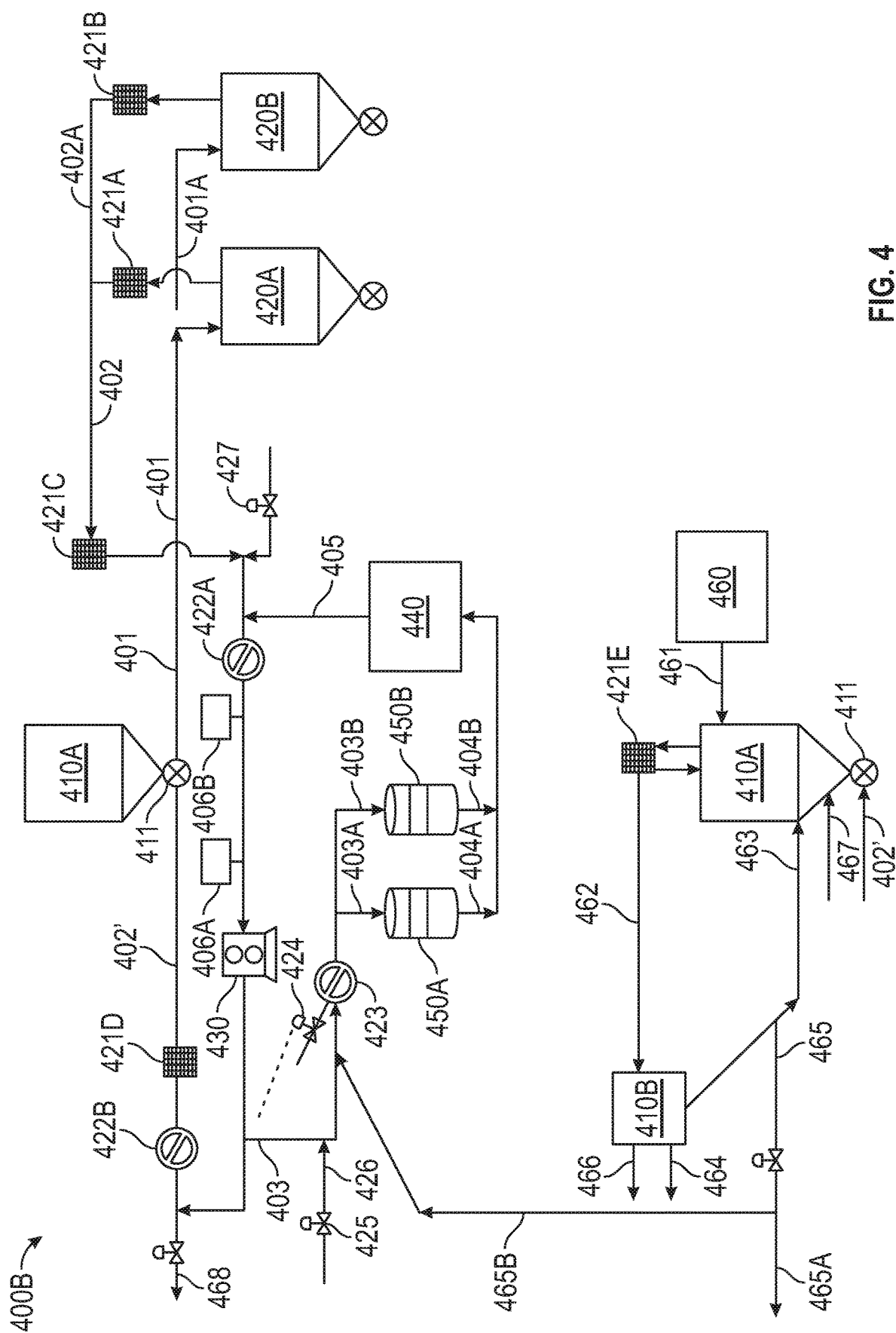
FIG. 4 illustrates a configuration of a closed-loop nitrogen transport system 400B which may be utilized to conserve nitrogen during transport of polymer fluff.

As discussed further with reference to FIG. 4, a nitrogen dryer or oxygen removal apparatus 440 can be positioned to dry, remove oxygen from, or dry and remove oxygen from the purified nitrogen stream prior to reintroduction thereof into second transfer line 402. One or more analyzer A1 may be configured to analyze the amount of one or more component (e.g., ethylene, isobutane, oxygen, 1-hexene, or a combination thereof) in the nitrogen gas in second transfer line 402 (upstream or downstream of introduction of the purified nitrogen gas thereto). The portion of second transfer stream 402 diverted to the online treatment unit 450A or 450B can be adjusted based on an amount of one or more of these components, in embodiments. In aspects, flow in spillback line 403 is such that the nitrogen gas in second nitrogen transfer line 402 comprises from about 50 to about 10,000 ppm hydrocarbons, from about 1,000 to about 2,600 ppm hydrocarbons, from about 50 to about 2,600 ppm hydrocarbons, or less than or equal to about 10,000, 5,000, 4,000, 3,000, 2,000, or 1,000 ppm hydrocarbons (e.g., 1-hexene).

An inlet line may be utilized to introduce a component into the spillback stream prior to introduction into the online treatment unit 450A or 450B. For example, a line 407 may be operable to introduce air into spillback line 403, for example, when treatment units 450A/450B comprise a catalytic converter.

FIG. 4 illustrates a configuration of a closed-loop nitrogen transport system 400B which may be utilized to conserve nitrogen during transport of polymer fluff according to another embodiment of this disclosure. Purge column or vessel 410A is depicted twice, for clarity, but may generally be the same unit.

Polymer product is produced and prepared for introduction into purge vessel 410A in polymerization system 460, which may be a polymerization system as described hereinabove (e.g., as described above with reference to polymerization zone 20 and product recovery system 30 of FIG. 1) or known in the art, for example as described in U.S. Pat. No. 7,087,685, the disclosure of which is hereby incorporated herein by reference for purposes not contrary to this disclosure. For example, polymerization system 460 can comprise a flash vessel or chamber as described hereinabove with reference to product recovery system 30 of FIG. 1. The polymer may be any mentioned hereinabove. In aspects, the polymer comprises polyethylene (PE). Polymer product is introduced into purge vessel 410A via line 461. Purge vessel 410A can be any purge vessel known in the art for separating entrained diluent within the polymer particles from a polymer fluff by passing nitrogen gas through the solid polymer particles (the fluff). The nitrogen extracts entrained diluent, liquid diluent, or both, thereby leaving solid polymer essentially free of entrained diluent. The solid polymer is then deposited collected, ejected, or otherwise withdrawn from a bottom portion of purge column 410A. Nitrogen can be introduced into purge vessel 410A via nitrogen return line 463, fresh nitrogen inlet line 467, nitrogen pressure line 402', which is the portion of second transfer line 402 that feeds purge vessel 410A, or a combination thereof.

The nitrogen and extracted diluent are then passed out a top portion of purge vessel 410A via filter 421E to an isobutane/nitrogen recovery unit (INRU) 410B. The INRU processes the vapors removed from the fluff in purge vessel 410A. INRU 410B separates the nitrogen from the diluent vapors by condensing the diluent vapors into liquids. In one sense, the INRU functions somewhat like a heavies removal system by condensing a relatively small amount of flash gas and sending a liquid to the heavies column. INRU 410B separates nitrogen from the diluent and other hydrocarbons. The INRU is designed to produce a product (extracted therefrom via line 464), which contains substantially all the hydrocarbons (but not the solid polymer particles) removed in purge vessel 410A.

The nitrogen separated in INRU 410B is then passed back to purge vessel 410A through nitrogen return line 463. In order to prevent buildup of hydrocarbon, a portion of the nitrogen in line 463 is removed via purge line 465. A portion of the nitrogen in line 465 can be sent to flare via flare line 465A. According to embodiments of this disclosure, a portion of the nitrogen in line 465 can be introduced into the online treater 450A or 450B, for example via line 465B, whereby the flared portion in line 465A can be reduced relative to conventional processes. The liquid product in line 464, which contains the separated diluent and other hydrocarbons, may have a flow rate in the range of from 2,000 to 10,000 kg/h, or from 3,500 to 4,500 kg/h. Line 462 may have a nitrogen flow rate of greater than or equal to about 500, 1,000, or 1,400 kg/h. Hydrogen purge 466 from INRU 410B may be sent to flare.

As noted below, regeneration of a saturated treatment unit 450A or 450B can be effected via introduction thereto of a hot (e.g., having a temperature of greater than or equal to about 80° C., 125° C., or 150° C.) nitrogen stream, which may be fresh or substantially pure (e.g., greater than about 99.9 mole percent nitrogen). In aspects, the regeneration gas withdrawn from the treatment unit 450A or 450B being regenerated can be introduced into the INRU for removal therefrom of hydrocarbons such as 1-hexene.

A rotary valve 411 may be configured for the removal of polymer fluff from purge vessel 410 via combination with nitrogen introduced thereto from second nitrogen nitrogen pressure section 402' of second nitrogen transfer line 402. After passing out of rotary valve 411, polymer fluff can be conveyed via nitrogen pressure to extruder feed vessel 420A. However, in aspects, after passing out of rotary valve 411, polymer fluff is conveyed via nitrogen pressure transport to fluff storage 420B via line 401A. As needed, stored polymer fluff in fluff storage 420B can be introduced into extruder feed vessel 420A.

When polymer fluff is being introduced into extruder feed vessel 420A, a gas stream comprising primarily nitrogen can be passed from extruder feed vessel 420A via second transport line 402. A filter 421A may serve to remove solids from the nitrogen gas removed from extruder feed vessel 420A. When polymer fluff is being stored in fluff storage 420B, a gas stream comprising primarily nitrogen can be removed from fluff storage 420B via line 402A. A filter 421B may serve to remove solids from the nitrogen gas removed from fluff storage 420B.

The gas comprising primarily nitrogen extracted from downstream vessel comprising extruder feed vessel 420A, fluff storage 420B, or both can comprise greater than or equal to about 2000, 2500, or 2600 ppm hydrocarbons. The gas comprising primarily nitrogen extracted from downstream vessel comprising extruder feed vessel 420A, fluff storage 420B, or both can pass through conveyor blower 430. Optionally, a suction filter 421C can be utilized to further reduce solids content within the gas comprising primarily nitrogen in second transfer line 402. A programmable interface controller (PIC) 427 may be operable to provide make-up nitrogen, as needed. A suction cooler 422A can be utilized to adjust the temperature of the nitrogen gas in second transfer line 402. For example, suction cooler 422A may be operable to reduce the temperature of the nitrogen conveying gas in second transfer line 402.

In embodiments, a spillback stream comprising a relatively small percentage (e.g., from about 5 to about 25, from about 10 to about 25, from about 5 to about 20, or less than or equal to about 25, 20, or 15 weight percent) of the nitrogen gas passing through conveyor blower 430 is diverted from the closed loop for introduction into an online treatment unit 450A or 450B. In other aspects, a spillback stream comprising a relatively large percentage (e.g., greater than or equal to about 25, 50, or 100 weight percent) of the nitrogen gas passing through conveyor blower 430 is diverted from the closed loop for introduction into an online treatment unit 450A or 450B. That is, in aspects rather than treating a spillback stream, the entirety of the nitrogen gas in second transfer line 402 is treated in the online treatment unit(s). Treatment of larger percentages of the nitrogen gas in second transfer line 402 may be effected with larger treatment units 450A/450B and concomitantly larger regeneration gas flow rates.

The remainder of the nitrogen gas passing through conveyor/blower 430 that is not diverted into the spillback stream may continue along second nitrogen transfer line 402, passing through discharge cooler 422B, filter 421D, or both, prior to introduction as nitrogen pressure section 402' of second nitrogen transfer line 402 to purge vessel 410A, for transport of additional polymer fluff therefrom. A portion of the remainder of the nitrogen gas may be purged via nitrogen purge line 468, which may send the purge nitrogen for flaring or other disposal.

When treatment unit 450A is online and treatment unit 450B off-line, the spillback stream is introduced into treatment unit 450A via spillback line 403. The amount of one or more contaminants or impurities in the nitrogen gas in second transfer line 402 may be determined via one or more inline analyzer. For example, an inline analyzer 406A may be operable to determine the amount of ethylene, isobutane, 1-hexene, or a combination thereof, and an inline analyzer 406B operable to determine the amount of oxygen in the nitrogen gas in second transfer line 402. In embodiments, an inline analyzer 406B may be configured to analyze oxygen concentration in purified nitrogen line 405. Although depicted as inline analyzers, it is envisioned that off-line analyzers could alternatively or additionally be utilized. In embodiments, one or more analyzer 406 is positioned on second nitrogen transfer line 402 downstream of purified nitrogen return line 405, downstream of suction filter 421C, upstream or downstream of suction cooler 422A, or a combination thereof. The flow of the spillback stream introduced into the online treatment unit via spillback line 403 can be adjusted or maintained based on a reading from an analyzer 406, e.g., based on a hydrocarbon reading in second transfer line 402.

The spillback stream is introduced into treatment unit 450A when treatment unit 450A is online via line 403A, and into treatment unit 450B via line 403B when treatment unit 450B is online. The online treatment unit 450A or 450B operates to remove hydrocarbons from the spillback stream introduced thereto via line 403A or 403B, respectively.

Purified nitrogen is removed from the online treatment unit 450A or 450B via purified nitrogen line 404A or 404B, respectively. The purified nitrogen from the online treatment unit 450A or 450B is introduced via purified nitrogen line 405 into second transfer line 402. The purified nitrogen stream may be introduced into second transfer line 402 downstream of extruder feed vessel filter 421A, downstream of fluff storage filter 421B, upstream or downstream of suction filter 421C, upstream of suction cooler 422A, or a combination thereof.

Treatment unit(s) 450A/450B can comprise catalytic converter(s) operable for catalytic oxidation of hydrocarbons in the nitrogen conveying loop. Any suitable catalytic converter known in the art can be utilized. For example, the catalytic converter may comprise D-150 Series Catalyst, D-300 Series Catalyst, M-300 Catalyst, or M-150 Catalyst, available from NETT® Technologies. To provide for combustion within the catalytic converters, in such embodiments, air may be introduced via air inlet line 426 and valve 425. A heater 423 may utilized upstream of treatment unit(s) 450A/450B. A temperature controller 424 may be operable to adjust an amount of cooling provided by cooler 423, an amount of oxygen (e.g., as air) introduced via line 426, or both, as the purified nitrogen exiting an online catalytic converter 450A/450B will have an elevated temperature (e.g., greater than or equal to 400° C.), in embodiments.

A nitrogen dryer/oxygen removal apparatus 440 may be utilized to dry the purified nitrogen stream, to remove oxygen therefrom, or both, prior to introduction into second transfer line 402.

Treatment unit(s) 450A/450B can be regenerated once saturated with adsorbed hydrocarbons or other impurities by taking the saturated treatment unit 450A or 450B off-line, placing the other treatment unit online, and regenerating the off-line treatment unit as appropriate for the adsorbent or other media therein. In aspects, regeneration of the saturated treatment unit comprises introducing a (relatively small flow of) hot nitrogen gas into the off-line treatment unit needing regeneration. For example, once saturated, online treatment unit 450A can be placed off-line, and treatment unit 450B placed online. Hot nitrogen gas can be introduced into off-line treatment unit 450A and passed through the treatment unit until it is regenerated, as known in the art. The nitrogen utilized during treatment unit regeneration may, in aspects, be high purity nitrogen product recovered during treater regeneration with a downstream silica bed, as described herein. Once saturated, online treatment unit 450B can be placed off-line, and treatment unit 450A placed online. Hot nitrogen gas can be introduced into off-line treatment unit 450B and passed through the treatment unit until it is regenerated.

By purifying a spillback stream of nitrogen, an INRU recycle loop purge stream of nitrogen, or both in a closed-loop conveying process via embodiments of this disclosure to maintain a desired level of hydrocarbons within the closed loop, one or more conventional purges that are sent to discharge, such as flare, can be reduced or eliminated. This reduction in nitrogen gas purge will provide for substantial savings in nitrogen cost, as the purified nitrogen can be reused (e.g., for further fluff conveyance) rather than flared. Removing combustion from the flare also reduces NOx emissions and provides for less onerous permitting. Elimination (or reduction) of nitrogen purge and combustion from the flare also reduces costs for fuel gas (e.g., natural gas) and steam conventionally used to flare a nitrogen purge stream of the closed loop, providing concomitant savings thereby.

Utilization of compressor/blower spillback to remove accumulating hydrocarbons (e.g., hexene) from a closed nitrogen transport loop as per embodiments of this disclosure can provide substantial nitrogen conservation. Regeneration flow during purge of the off-line treatment unit can be small, and may be managed by an existing INRU, where the hydrocarbon (e.g., 1-hexene) can be eliminated from the hot nitrogen utilized as treatment unit regeneration gas.

Additional advantages of the systems, processes, or both for closed-loop nitrogen conveying as disclosed herein can be apparent to one of skill in the art viewing this disclosure.

EXAMPLE

The disclosure having been generally described, the following example is given as a particular aspect of the disclosure and to demonstrate the practice and advantages thereof. It is understood that the example is given by way of illustration and is not intended to limit the specification or the claims in any manner.

Example 1: Treater Bed Regeneration Utilizing Silica Bed for Nitrogen Conservation The following example is for a generic 250 kta loop slurry PE plant. Table 1 shows nitrogen flow during and duration times for various phases of regeneration of an exemplary ethylene treater.

TABLE 1

Nitrogen Flow Rate During Ethylene Treater Regeneration Process

| Phase | $N_2$ Flow Rate (kg/h) | Duration (h) |
|---|---|---|
| Purge | 2500 | 2.5 |
| Heating | 5000 | 45 |
| Holding | 5000 | 2 |
| Cooling | 5000 | 44 |

Figure 5:
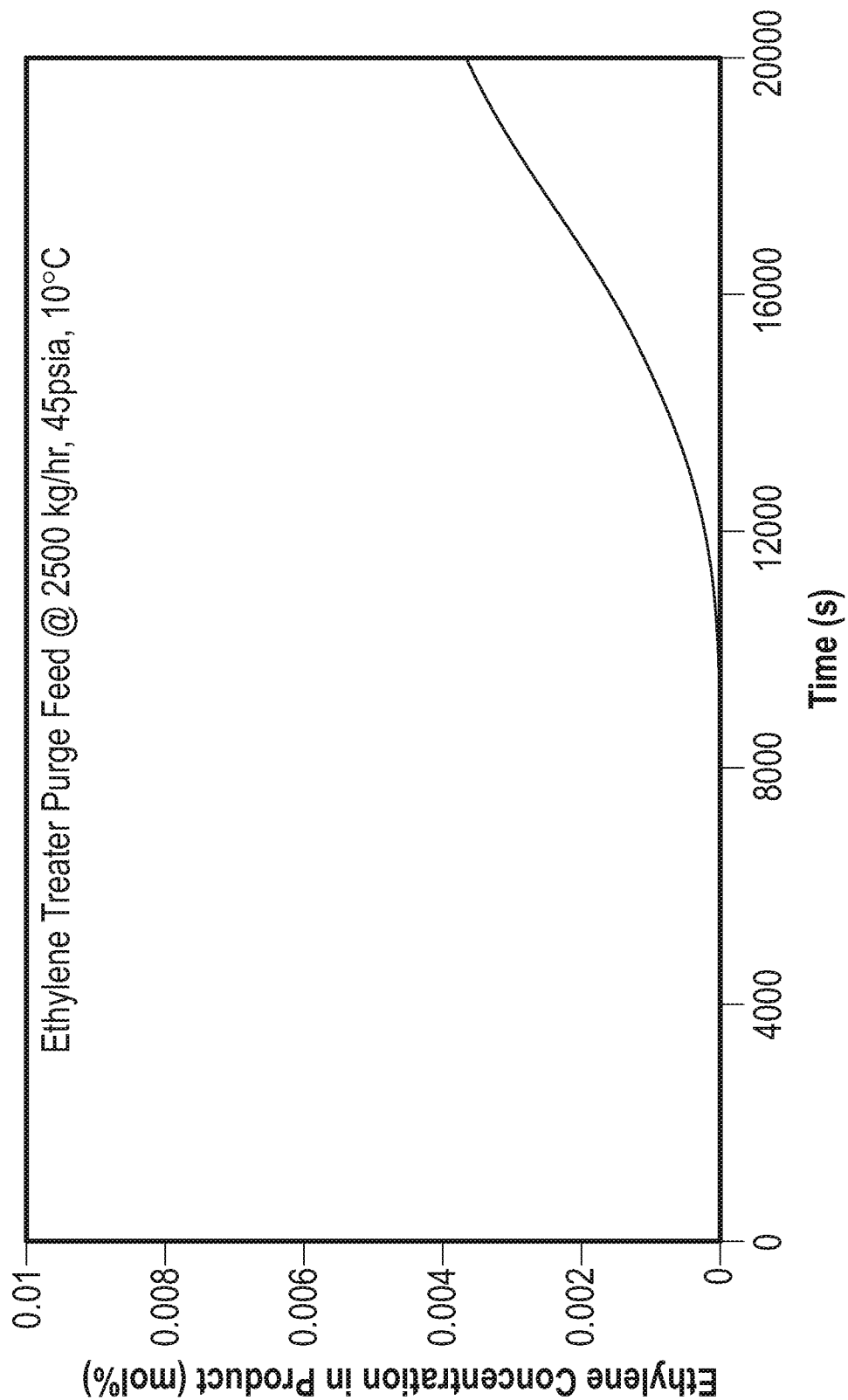
FIG. 5 is a plot of ethylene concentration in a nitrogen product as a function of time after a treater purge gas effluent is passed through a silica bed, as described in Example 1.

The pressure of the purge stream at the outlet of the ethylene treater bed (i.e., of the ethylene treater bed purge phase effluent) is about 50 psia. The temperature of this stream leaving the treater may be as low as −46° C. For this example, the feed to the silica bed was chosen to have a pressure of 45 psia and a temperature of 10° C. A lower feed temperature would favor hydrocarbon adsorption on the silica bed. FIG. 5 is a plot of ethylene concentration in the nitrogen product as a function of time after the treater purge gas effluent is passed through a silica bed, as predicted by an ASPEN ADSORPTION® single bed model. Although it varies from different plants, the ethylene concentration in the silica bed feed was assumed to be 0.5 mol % or 5000 ppmv, balanced with nitrogen. As revealed by the model, the ethylene concentration in the nitrogen product was about 14 ppmv after 9000 seconds or 2.5 hours of adsorption. This result indicates that a single silica bed may be used to remove ethylene during the entire ethylene treater purge step.

ASPEN ADSORPTION® cyclic models were built to evaluate the regenerability of the silica bed, with two different nitrogen purge gas flow rates. The results are summarized in Table 2. No optimization was performed in terms of purge gas flow rate or purge phase duration. (C2= is ethylene.)

TABLE 2

Silica Bed Stream Comparison with Different Nitrogen Purge Flow

| Purge Gas | C2 = in Product (mole %) | $N_2$ in Product (mole %) | C2 = in Tail (mole %) | $N_2$ in Tail (mole %) |
|---|---|---|---|---|
| 500 kg/h for 3000 s | 0.11 | 99.89 | 1.47 | 98.53 |
| 1000 kg/h for 3000 s | 0.02 | 99.98 | 1.37 | 98.63 |

As seen in Table 2, the ethylene concentration in the effluent from the silica bed ranges from 0.02 mol % to 0.11 mol %, depending on the purge gas flow. These values are significantly lower than the feed ethylene concentration (0.5 mol %). The silica bed tail gas stream had a concentration of ethylene almost three times that of the feed.

If 1000 kg/h of purge gas is employed for a silica bed purge period of 50 minutes, using the entire 5000 kg/h treater cool down step flow rate only 10 minutes will be needed to complete the purge step (Stage III of FIG. 2C) during the silica bed regeneration process. Moreover, as the temperature of the cool down step nitrogen is much higher than ambient temperature, the actual purge time can be expected to be less than 10 minutes. Since this 10 minute purge period stream is ethylene enriched and will be sent to flare, the potential nitrogen recovery for the treater cool down step is 5000 kg/h×(44 h−10 min/60 min/h)×12 regenerations/year=2,630,000 kg/year. Combined with the nitrogen recovery in the treater bed purge step, i.e. 2500 kg/h×2.5 h×12 regenerations/year=75,000 kg/year. The total amount of reduced nitrogen sent to flare for an ethylene treater regeneration process of such a 250 kta (kilotons per annum) loop slurry PE plant may be approximately 2,705,000 kg/year.

The silica bed used in the above example was designed to be 15 meters high with an internal diameter of 3.6 meters. The total silica loading was about 110,173 kg. Table 3 shows nitrogen flow rate during various steps of a treater regeneration process for various hydrocarbon treaters for a generic 250 kta loop slurry PE plant.

TABLE 3

Nitrogen Flow Rates During Isobutane and 1-Hexene Treater Regeneration

| Phase | Recycle Isobutane Treater | | Olefin Free Isobutane Treater | | 1-Hexene Treater | | Recovered $N_2$ (kg/yr) |
|---|---|---|---|---|---|---|---|
| | $N_2$ Flow Rate (kg/h) | Duration (h) | $N_2$ Flow Rate (kg/h) | Duration (h) | $N_2$ Flow Rate (kg/h) | Duration (h) | |
| Purge | 2000 | 2.5 | 300 | 2.5 | 500 | 2.5 | 20,750 |
| Heating | 4000 | 22 | 605 | 34 | 500 | 31 | |
| Holding | 4000 | 2 | 605 | 2 | 500 | 2 | |
| Cooling | 4000 | 21 | 605 | 32 | 500 | 29 | 1,404,110 |

For the silica bed purge process, 10 minutes of purge time was assumed when estimating the total potential nitrogen recovery for the isobutane and 1-hexene treaters. The total potential nitrogen recovery for all the treaters in such a generic 250 kta loop slurry PE plant may be about 4,129,860 kg/year.

ADDITIONAL DISCLOSURE

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are nonlimiting, specific embodiments in accordance with the present disclosure:

A: A system for recovering nitrogen during regeneration of a treater, the system comprising: an adsorbent bed downstream of the treater, wherein the adsorbent bed comprises an adsorbent operable to adsorb at least one impurity from a treater bed regeneration effluent stream comprising nitrogen to provide a nitrogen product having a higher nitrogen purity than a nitrogen purity of the treater bed regeneration effluent stream.

B: A method for recovering nitrogen during regeneration of a treater bed, the method comprising: introducing a treater bed regeneration effluent stream comprising nitrogen and at least one impurity into an adsorbent bed, wherein the adsorbent bed comprises an adsorbent operable to adsorb the at least one impurity from the treater bed regeneration effluent stream to provide a nitrogen product having a higher nitrogen purity than a nitrogen purity of the treater bed regeneration effluent stream.

C: A closed-loop nitrogen transport system comprising: a first transfer line configured for nitrogen pressure conveyance of a polymer fluff from at least one upstream vessel to at least one downstream vessel; a second transfer line configured to return a nitrogen gas stream comprising primarily nitrogen from the at least one downstream vessel to the at least one upstream vessel; a conveyor blower operable to provide flow throughout the closed loop; and a treatment unit operable to remove hydrocarbons from at least a portion of the nitrogen gas stream comprising primarily nitrogen, to provide a purified nitrogen stream.

D: A closed-loop nitrogen transport process comprising: conveying, with nitrogen gas, a polymer fluff from at least one upstream vessel to at least one downstream vessel via a first transfer line; utilizing a conveyor blower to return a nitrogen gas stream comprising primarily nitrogen from the at least one downstream vessel to the at least one upstream vessel via a second transfer line; introducing at least a portion of the nitrogen gas stream comprising primarily nitrogen into a treatment unit operable to remove hydrocarbons therefrom and provide a purified nitrogen stream; and introducing at least a portion of the purified nitrogen stream into the at least upstream vessel, the first transfer line, the second transfer line, or a combination thereof, whereby a concentration of hydrocarbons in the nitrogen gas stream comprising primarily nitrogen is maintained at a desired level.

E: A method comprising: contacting a nitrogen purge stream comprising a contaminant selected from hydrocarbons, water, carbon dioxide, carbon monoxide, alcohols, acetylene, carbonyls, sulfur compounds, peroxides, ammonia, amines, phosphines, oxygen, or combinations thereof with an adsorbent, a catalyst, or both to produce a treated nitrogen purge stream comprising a reduced amount of the contaminant, wherein the nitrogen purge stream is produced in a polymerization process.

Each of embodiments A, B, C, D, and E may have one or more of the following additional elements. Element 1:

wherein the adsorbent bed comprises a pressure swing adsorption unit. Element 2: wherein the adsorbent comprises silica gel. Element 3: wherein the treater comprises a treater configured to remove at least one component from a feed stream to a polyethylene (PE) polymerization reactor. Element 4: wherein the feed stream comprises primarily isobutane, ethylene, 1-hexene, 1-butene, 1-octene, or a combination thereof. Element 5: wherein the at least one component is selected from water, carbon dioxide, carbon monoxide, alcohols, acetylene, carbonyls, sulfur compounds, peroxides, ammonia, amines, phosphines, oxygen, or combinations thereof. Element 6: wherein the treater contains a desiccant. Element 7: wherein the desiccant comprises a zeolite, molecular sieve, alumina, or a combination thereof. Element 8: wherein the zeolite comprises zeolite 3A, zeolite 4A, zeolite 13X, or a combination thereof, wherein the alumina comprises SELEXSORB®, or both. Element 9: wherein the at least one impurity comprises a hydrocarbon, water, carbon dioxide, carbon monoxide, alcohols, acetylene, carbonyls, sulfur compounds, peroxides, ammonia, amines, phosphines, oxygen, or combinations thereof. Element 10: wherein the hydrocarbon comprises ethylene, isobutane, 1-hexene, 1-butene, 1-octene, or a combination thereof. Element 11: wherein the nitrogen purity of the nitrogen product is greater than or equal to about 99.8, 99.9, or 99.98 mole percent. Element 12: wherein the regeneration of the treater includes a nitrogen purge step, a heating step, a hold step, a cool down step, or a combination thereof, and wherein the treater bed regeneration effluent is a product of the nitrogen purge step, the cool down step, or a combination thereof. Element 13: further comprising regenerating the treater bed by purging the treater bed, heating the treater bed to a regeneration temperature, holding the treater bed at the regeneration temperature, cooling down the treater bed, or a combination thereof, and wherein the treater bed regeneration effluent stream introduced into the adsorbent bed is produced during the purging of the treater bed, the cooling down of the treater bed, or a combination thereof. Element 14: further comprising regenerating the adsorbent bed during the heating of the treater bed to the regeneration temperature, the holding of the treater bed at the regeneration temperature, or both, by depressurizing the adsorbent bed to a pressure below an adsorption pressure; introducing a gas comprising nitrogen into the depressurized adsorbent bed; and repressurizing the adsorbent bed to the adsorption pressure. Element 15: wherein the gas comprising nitrogen comprises a treater bed regeneration effluent produced during the cooling down of the treater bed, substantially pure nitrogen, or a combination thereof. Element 16: wherein regenerating the adsorbent bed further comprises introducing substantially pure nitrogen into the adsorbent bed. Element 17: wherein regeneration of the adsorbent bed produces a tail gas enriched in hydrocarbons relative to the treater bed regeneration effluent stream introduced into the adsorbent bed. Element 18: further comprising eradicating (e.g., via flare, thermal oxidizer, or the like) at least a portion of the tail gas enriched in hydrocarbons, recycling at least a portion of the nitrogen product to regeneration of the treater bed, or both. Element 19: wherein the treater bed is being regenerated after operating to remove at least one component from a feed stream to a polyethylene (PE) polymerization reactor. Element 20: further comprising a spillback line configured to remove the at least a portion of the nitrogen gas stream from the second transfer line and introduce same into the treatment unit, and a purified nitrogen return line configured to introduce the purified nitrogen stream into the second transfer line. Element 21: wherein the conveyor blower is on the second transfer line, and wherein the spillback line is downstream (discharge) of the conveyor blower. Element 22: wherein the purified nitrogen return line is configured to introduce the purified nitrogen stream into the second transfer line upstream (suction) of the conveyor blower. Element 23: wherein the treatment unit comprises an adsorbent bed, a membrane-based separation unit, a catalytic converter, a refrigeration unit, a pressurized or high pressure oil absorption unit, or a combination thereof. Element 24: wherein the adsorbent bed comprises a polymeric adsorbent, silica, activated charcoal, zeolite molecular sieve, or a combination thereof. Element 25: wherein the treatment comprises a pressure swing adsorption (PSA) unit. Element 26: wherein the at least one upstream vessel comprises a purge column downstream of one or more polymerization reactors and configured to separate a purge gas from a polymer fluff introduced thereto. Element 27: further comprising an isobutane nitrogen recovery unit (INRU) fluidly connected with the purge column and configured to separate a nitrogen-containing gas from the purge gas to provide a stream (which may be a side stream) comprising recovered diluent and other hydrocarbons. Element 28: further comprising a line configured to introduce at least a portion of the nitrogen-containing gas from the INRU into the purge column, a line configured to introduce at least a portion of the nitrogen-containing gas from the INRU into the treatment unit, or a combination thereof. Element 29: further comprising a polymerization reactor operable to produce the polymer fluff. Element 30: wherein the polymer fluff comprises polyethylene (PE). Element 31: wherein the at least one downstream vessel comprises an extruder feed hopper, an extruder, a fluff storage vessel, or a combination thereof. Element 32: comprising at least two treatment units, whereby one of the at least two treatment unit can be online while another of the at least two treatment units is off-line. Element 33: wherein the desired level is in the range of from 50 to 10,000 ppm hydrocarbons. Element 34: further comprising separating a nitrogen-containing gas from a purge gas extracted from the purge column. Element 35: further comprising introducing at least a portion of the nitrogen-containing gas into the purge column, introducing at least a portion of the nitrogen-containing gas into the treatment unit, or both. Element 36: wherein the nitrogen purge stream is produced in an ethylene polymerization process. Element 37: wherein the nitrogen purge stream is a nitrogen purge of a closed-loop nitrogen transport system utilized to transfer a polymer fluff from an upstream vessel to a downstream vessel, wherein the nitrogen purge stream is a treater bed regeneration effluent stream produced during regeneration of a treater bed utilized to remove at least one impurity from a feed stream to a polymerization reactor, or a combination thereof. Element 38: wherein the upstream vessel comprises a purge column configured to separate a purge gas from a polymer fluff introduced thereto; wherein the downstream vessel comprises an extruder feed hopper, an extruder, a fluff storage vessel, or a combination thereof; or both. Element 39: wherein the adsorbent comprises silica gel, a polymeric adsorbent, activated charcoal, or a combination thereof; wherein the catalyst comprises a catalytic converter; or both.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

We claim:

1. A system for recovering nitrogen during regeneration of a treater, the system comprising:
the treater configured for regeneration via a nitrogen purge step, a heating step, a hold step, a cool down step, or a combination thereof, and wherein a treater bed regeneration effluent is a product of the nitrogen purge step, the cool down step, or a combination thereof;
an adsorbent bed downstream of the treater, wherein the adsorbent bed comprises an adsorbent operable to adsorb at least one impurity from the treater bed regeneration effluent stream comprising nitrogen to provide a nitrogen product having a higher nitrogen purity than a nitrogen purity of the treater bed regeneration effluent stream,
wherein the adsorbent bed comprises a pressure swing adsorption unit configured for regeneration of the adsorbent bed by (i) depressurization of the adsorbent bed to a pressure below an adsorption pressure; (ii) introduction of gas comprising nitrogen into the depressurized adsorbent bed; and (iii) repressurization of the adsorbent bed to the adsorption pressure.

2. The system of claim 1, wherein the adsorbent comprises silica gel.

3. The system of claim 1, wherein the treater comprises a treater configured to remove at least one component from a feed stream to a polyethylene (PE) polymerization reactor; or wherein the treater contains a desiccant selected from zeolites, molecular sieves, alumina, or combinations thereof; or both.

4. The system of claim 3, wherein the feed stream comprises primarily isobutane, ethylene, 1-hexene, 1-butene, 1-octene, or a combination thereof; or wherein the nitrogen purity of the nitrogen product is greater than or equal to about 99.8 mole percent; or both.

5. The system of claim 3, wherein the at least one component is selected from water, carbon dioxide, carbon monoxide, alcohols, acetylene, carbonyls, sulfur compounds, peroxides, ammonia, amines, phosphines, oxygen, or combinations thereof; or wherein the at least one impurity comprises a hydrocarbon, water, carbon dioxide, carbon monoxide, alcohols, acetylene, carbonyls, sulfur compounds, peroxides, ammonia, amines, phosphines, oxygen, or combinations thereof; or both.

6. The system of claim 1, wherein regeneration of the adsorbent bed is performed during the heating step, the holding step, or both.

7. A method for recovering nitrogen during regeneration of a treater bed, the method comprising:
regenerating the treater bed by purging the treater bed, heating the treater bed to a regeneration temperature, holding the treater bed at the regeneration temperature, cooling down the treater bed, or a combination thereof;
introducing a treater bed regeneration effluent stream comprising nitrogen and at least one impurity into an adsorbent bed, wherein the adsorbent bed comprises an adsorbent operable to adsorb the at least one impurity from the treater bed regeneration effluent stream to provide a nitrogen product having a higher nitrogen purity than a nitrogen purity of the treater bed regeneration effluent stream, wherein the treater bed regeneration effluent stream introduced into the adsorbent bed is produced during the purging of the treater bed, the cooling down of the treater bed, or a combination thereof; and
regenerating the adsorbent bed during the heating of the treater bed to the regeneration temperature, the holding of the treater bed at the regeneration temperature, or both, by depressurizing the adsorbent bed to a pressure below an adsorption pressure; introducing a gas comprising nitrogen into the depressurized adsorbent bed; and repressurizing the adsorbent bed to the adsorption pressure.

8. The method of claim 7, wherein the adsorbent comprises silica gel, or wherein the adsorbent bed comprises a pressure swing adsorption unit, or both.

9. The method of claim 7, wherein the gas comprising nitrogen comprises a treater bed regeneration effluent produced during the cooling down of the treater bed, substantially pure nitrogen, or a combination thereof; or wherein regeneration of the adsorbent bed produces a tail gas enriched in hydrocarbons relative to the treater bed regeneration effluent stream introduced into the adsorbent bed; or both.

10. The method of claim 7, wherein the treater bed is being regenerated after operating to remove at least one component from a feed stream to a polyethylene (PE) polymerization reactor; or wherein the feed stream comprises primarily isobutane, ethylene, 1-hexene, 1-butene, 1-octene, or a combination thereof; or both.

11. The method of claim 10, wherein the at least one component is selected from water, carbon dioxide, carbon monoxide, alcohols, acetylene, carbonyls, sulfur compounds, peroxides, ammonia, amines, phosphines, oxygen, or combinations thereof, or wherein the at least one impurity comprises a hydrocarbon, water, carbon dioxide, carbon monoxide, alcohols, acetylene, carbonyls, sulfur compounds, peroxides, ammonia, amines, phosphines, oxygen, or combinations thereof; or both.

12. A method for recovering nitrogen during regeneration of a treater bed, the method comprising:
contacting a feed stream to a polyethylene polymerization reactor with a treater bed to remove at least one component from the feed stream;
regenerating the treater bed to yield a treater bed regeneration effluent stream comprising nitrogen and at least one impurity;
contacting the treater bed regeneration effluent with an adsorbent bed to remove at least a portion of impurity from the treater bed regeneration effluent stream and provide a nitrogen product having a higher nitrogen purity than a nitrogen purity of the treater bed regeneration effluent stream; and
regenerating the adsorbent bed by depressurizing the adsorbent bed to a pressure below an adsorption pressure; introducing a gas comprising nitrogen into the depressurized adsorbent bed; and repressurizing the adsorbent bed to the adsorption pressure.

13. The method of claim 12, wherein regenerating the adsorbent bed is performed during the heating of the treater bed to the regeneration temperature, the holding of the treater bed at the regeneration temperature, or both.

14. The method of claim 12, wherein regenerating the treater bed further comprises purging the treater bed, heating the treater bed to a regeneration temperature, holding the treater bed at the regeneration temperature, cooling down the treater bed, or a combination thereof.

15. The method of claim 14, wherein regenerating the adsorbent bed produces a tail gas enriched in hydrocarbons relative to the treater bed regeneration effluent stream introduced into the adsorbent bed.

16. The method of claim 15, wherein further comprising flaring at least a portion of the tail gas enriched in hydrocarbons, or recycling at least a portion of the nitrogen product to regeneration of the treater bed, or both.

17. The method of claim 16, wherein the adsorbent comprises silica gel, or wherein the adsorbent bed comprises a pressure swing adsorption unit, or both.

18. The method of claim 17, wherein the treater bed contains a desiccant selected from zeolites, molecular sieves, alumina, or combinations thereof.

19. The method of claim 18, wherein the feed stream comprises primarily isobutane, ethylene, 1-hexene, 1-butene, 1-octene, or a combination thereof, or wherein the nitrogen purity of the nitrogen product is greater than or equal to about 99.8 mole percent; or both.

20. The method of claim 19, wherein the at least one component is selected from water, carbon dioxide, carbon monoxide, alcohols, acetylene, carbonyls, sulfur compounds, peroxides, ammonia, amines, phosphines, oxygen, or combinations thereof, or wherein the at least one impurity comprises a hydrocarbon, water, carbon dioxide, carbon monoxide, alcohols, acetylene, carbonyls, sulfur compounds, peroxides, ammonia, amines, phosphines, oxygen, or combinations thereof; or both.

* * * * *